US007817162B2

(12) United States Patent
Bolick et al.

(10) Patent No.: US 7,817,162 B2
(45) Date of Patent: Oct. 19, 2010

(54) VIRTUAL BLASTING SYSTEM FOR REMOVAL OF COATING AND/OR RUST FROM A VIRTUAL SURFACE

(75) Inventors: Michael Bolick, Waterloo, IA (US); Chris Lampe, Cedar Falls, IA (US); Jason Ebensberger, Cedar Falls, IA (US); Jeremiah Treloar, Waterloo, IA (US); Rick Klein, Waterloo, IA (US); Eric Conrad Peterson, San Antonio, TX (US); Chad Jason Zalkin, San Antonio, TX (US)

(73) Assignee: University of Northern Iowa Research Foundation, Cedar Falls, IA (US)

( * ) Notice: Subject to any disclaimer, the term of this patent is extended or adjusted under 35 U.S.C. 154(b) by 285 days.

(21) Appl. No.: 12/028,917

(22) Filed: Feb. 11, 2008

(65) Prior Publication Data
US 2009/0202975 A1 Aug. 13, 2009

(51) Int. Cl.
*G09G 5/02* (2006.01)
(52) U.S. Cl. ...................... 345/592; 345/633
(58) Field of Classification Search ................. 345/633, 345/592
See application file for complete search history.

(56) References Cited
U.S. PATENT DOCUMENTS

| | | |
|---|---|---|
| 5,102,045 A | 4/1992 | Diana |
| 5,289,974 A | 3/1994 | Grime et al. |
| 5,592,597 A | 1/1997 | Kiss |
| 5,598,972 A | 2/1997 | Klein, II et al. |
| 5,757,498 A | 5/1998 | Klein, II et al. |
| 5,812,257 A | 9/1998 | Teitel et al. |
| 5,857,625 A | 1/1999 | Klein et al. |
| 5,868,840 A | 2/1999 | Klein, II et al. |
| 5,951,296 A | 9/1999 | Klein |

(Continued)

FOREIGN PATENT DOCUMENTS

WO 92/07346 A1 4/1992

(Continued)

OTHER PUBLICATIONS

Lorenc et al., Robotic Bridge Maintenance System, NC State University Center for Transporation Engineering Studies, pp. 1-48, Mar. 1998, pp. 1-48.*

(Continued)

*Primary Examiner*—M Good Johnson
(74) *Attorney, Agent, or Firm*—Andrus, Sceales, Starke & Sawall, LLP

(57) ABSTRACT

A computer simulation and virtual reality system simulates the use of a blasting nozzle to remove one or more coatings and/or rust from a virtual surface. The user operates an electronic controller in the form of a blasting nozzle that outputs a signal indicating whether the blasting nozzle controller is in an "on" position or in an "off" position. The system also has a motion tracking system that tracks the position and orientation of the blasting nozzle controller with respect to the virtual surface defined on the display screen. Simulation software in a computer generates virtual blast pattern data, and the removal of the virtual coating(s) and/or rust image from the virtual surface is displayed in real time on the display screen.

22 Claims, 14 Drawing Sheets

U.S. PATENT DOCUMENTS

| | | | |
|---|---|---|---|
| 6,176,837 | B1 | 1/2001 | Foxlin |
| 6,409,687 | B1 | 6/2002 | Foxlin |
| 6,717,584 | B2 | 4/2004 | Kulczycka |
| 6,757,068 | B2 | 6/2004 | Foxlin |
| 6,801,211 | B2 | 10/2004 | Forsline et al. |
| 6,896,192 | B2 | 5/2005 | Horan et al. |
| 6,963,331 | B1 | 11/2005 | Kobayashi et al. |
| 7,106,343 | B1 | 9/2006 | Hickman |
| 7,244,464 | B2 * | 7/2007 | Robens et al. ............... 427/8 |
| 7,270,593 | B2 * | 9/2007 | Klein et al. .................. 451/6 |
| 7,511,703 | B2 * | 3/2009 | Wilson et al. ............ 345/175 |
| 7,542,032 | B2 * | 6/2009 | Kruse ...................... 345/418 |
| 2003/0178503 | A1 | 9/2003 | Horan et al. |
| 2003/0218596 | A1 | 11/2003 | Eschler |
| 2004/0046736 | A1 | 3/2004 | Pryor et al. |
| 2004/0201857 | A1 | 10/2004 | Foxlin |
| 2004/0233223 | A1 | 11/2004 | Schkolne et al. |
| 2006/0007123 | A1 | 1/2006 | Wilson et al. |
| 2006/0171771 | A1 | 8/2006 | Kruse |

FOREIGN PATENT DOCUMENTS

| | | |
|---|---|---|
| WO | WO0241127 A2 | 5/2002 |

OTHER PUBLICATIONS

"We Bring 3D to Life", InterSense web page, pp. 1-2, admitted prior art.
"IS-900 MiniTrax Devices", InterSense web page, admitted prior art.
"Cost Effective 6-DEF Tracking", InterSense web page, admitted prior art.
"InterSense delivers Tracking Systems to support a Welding Simulator Program developed by Immersion SAS", InterSense web page, pp. 1-2, admitted prior art.
"Technical Overview PCTracker", InterSense web page, pp. 1-5, admitted prior art.
"Industrial Simulation & Training", InterSense web page, admitted prior art.
"The Virtual Welding Trainer", CS Wave web page, Index—pp. 1-3;—"Architecture", CS Wave web page, pp. 1-2;—"Module formateur", CS Wave web page, pp. 1-2;—"Module eleve", CS Wave web page, pp. 1-2 ( admitted prior art).
"Johnson Center for Virtual Reality", Pine Technical College web site, admitted prior art.
"Fastrak Technical Summary", Polhemus web site, pp. 1-3;—"Industrial Training Simulations", Polhemus web site , p. 1 (admitted prior art).
"SwRI-Owned Three-Dimensional Graphics Engine Development, 07-9459", Southwest Research Institute, Abstract re: GRAIL™ Graphics Interface Library, pp. 1-2, admitted prior art.
Reilly: "New Technologies reflect success", Closed Loop, vol. 15.2, 2005, pp. 1-4, Iowa Waste Reduction Center. Retrieved from the Internet: www.iwrc.org/downloads/pdf/CLSpring2005.pdf.
Iowa Waste Reduction Center: "STAR4D New Technologies Reflect Success", 2005, p. 1. Retrieved from the Internet: 222.star4d.org/uploads/New_Technologies.pdf.
Polhemus: "The Johnson Center for Virtual Reality: Industrial Training Simulations", 2005, p. 1. Retrieved from the Internet: www.polhemus.com/polhemus_editor/assets/Pinetechcollege_FASTRAK.pdf.
Heckman: "Virtual Reality Simulator System and Training Program", 2005, pp. 1-2. Retrieved from the Internet: www.mnscu.edu/media/publications/pdf/fed05pine.pdf.
Wormell, Foxlin: "Advancements in 3D Interactive Devices for Virtual Environments", 2003, pp. 1-10. Retrieved from the Internet: www.isense.com/uploadedFiles/Products/White_Papers/Advancements%20in%203D%20Interactive%20Device%20for%20Virtual%20Environments.pdf.
John Heckman et al, Virtual Reality Painter Training Becomes Real, Metal Finishing, May 2003, p. 1, 22 & 24-26, vol. 101, Issue 5.
Maneesh Agrawala et al, 3D Painting on Scanned Surfaces, Symposium on Interactive 3D Graphics, 1995, pp. 145-150 & 215, Association of Computing Machinery.
Carolina Cruz-Neira et al, Surround-Screen Projection-Based Virtual Reality: The Design and Implementation of the CAVE, 1993, p. 135-142, Association for Computing Machinery.
Julie Daily et al, 3D Painting: Paradigms for Painting in a New Dimension, CHI 95 Mosaic of Creativity, May 7-11, 1995, p. 296-297, CHI Companion 95, Denver, Colorado.
Kenneth Fast et al, Virtual Training for Welding, Computer Society, Mar. 2004, Third IEEE & ACM International Symposium on Mixed and Augmented Reality.
Pat Hanrahan et al, Direct WYSIWYG Painting and Texturing on 3D Shapes, Computer Graphics, Aug. 1990, p. 215-223, vol. 24, Association for Computing Machinery.
J.A. Jordan et al, Virtual Reality Training Leads to Faster Adaptation to the Novel Psychomotor Restrictions Encountered by Laparoscopic Surgeons, Surgical Endoscopy, Aug. 2001, p. 1080-1084, Springer-Verlag New York, Inc.
Ron Joseph et al, The Environmental and Cost Benefits of Painter Training, Metal Finishing, Mar. 1998, p. 26, 28, 30-31, Elsevier Science Inc.
Daniel F. Keefe et al, CavePainting: A Fully Immersive 3D Artistic Medium and Interactive Experience, 2001, p. 85-93, ACM.
F.D. Rose et al, Transfer of Training from Virtual to Real Environments, Proc. 2nd Euro. Conf. Disability, Virtual Reality & Assoc. Tech., 1998, p. 69-75, ECDVRAT and University of Reading, UK.
F.D. Rose et al, Training in Virtual Environments: Transfer to Real World Tasks and Equivalence to Real Task Training, Ergonomics, 2000, p. 494-511, vol. 43, Taylor and Francis Ltd.
Neal E. Seymour et al, Virtual Reality Training Improves Operating Room Performance, Annals of Surgery, Oct. 2002, p. 458-464, vol. 236, Lippincott, Williams & Wilkins, Inc.
D. Wormell et al, Advancements in 3D Interactive Devices for Virtual Environments, InterSense, Inc., 2003, p. 47-56, The Eurographics Association.

* cited by examiner

FIG. 8

BLASTING LESSON IN PROGRESS

LESSON NAME: LESSON 1
SURFACE TYPE: RECTANGLE

MEDIA TYPE: HARD
AIR PRESSURE: 100 PSI
FLOW RATE: 50 %

☐ PLAY AUDIO
☑ SHOW CURRENT SCORE
☑ SHOW SETTINGS
☐ SHOW ASSESSMENT
☑ SHOW LASERGUIDE

CURRENT SCORE

STUDENT NAME: JOE BOLICK

MEDIA USED: 20.88 LBS
PERCENT CLEANED: 18
PERCENT OVERBLASTED: 0
PERCENT UNDERBLASTED: 18
SCORE: 0
ELAPSED TIME: 07:01

PREVIOUS SCORES

| DATE | SCORE | % OVER | % UNDER | % CLEAN | TIME |
|------|-------|--------|---------|---------|------|
|      |       |        |         |         |      |
|      |       |        |         |         |      |

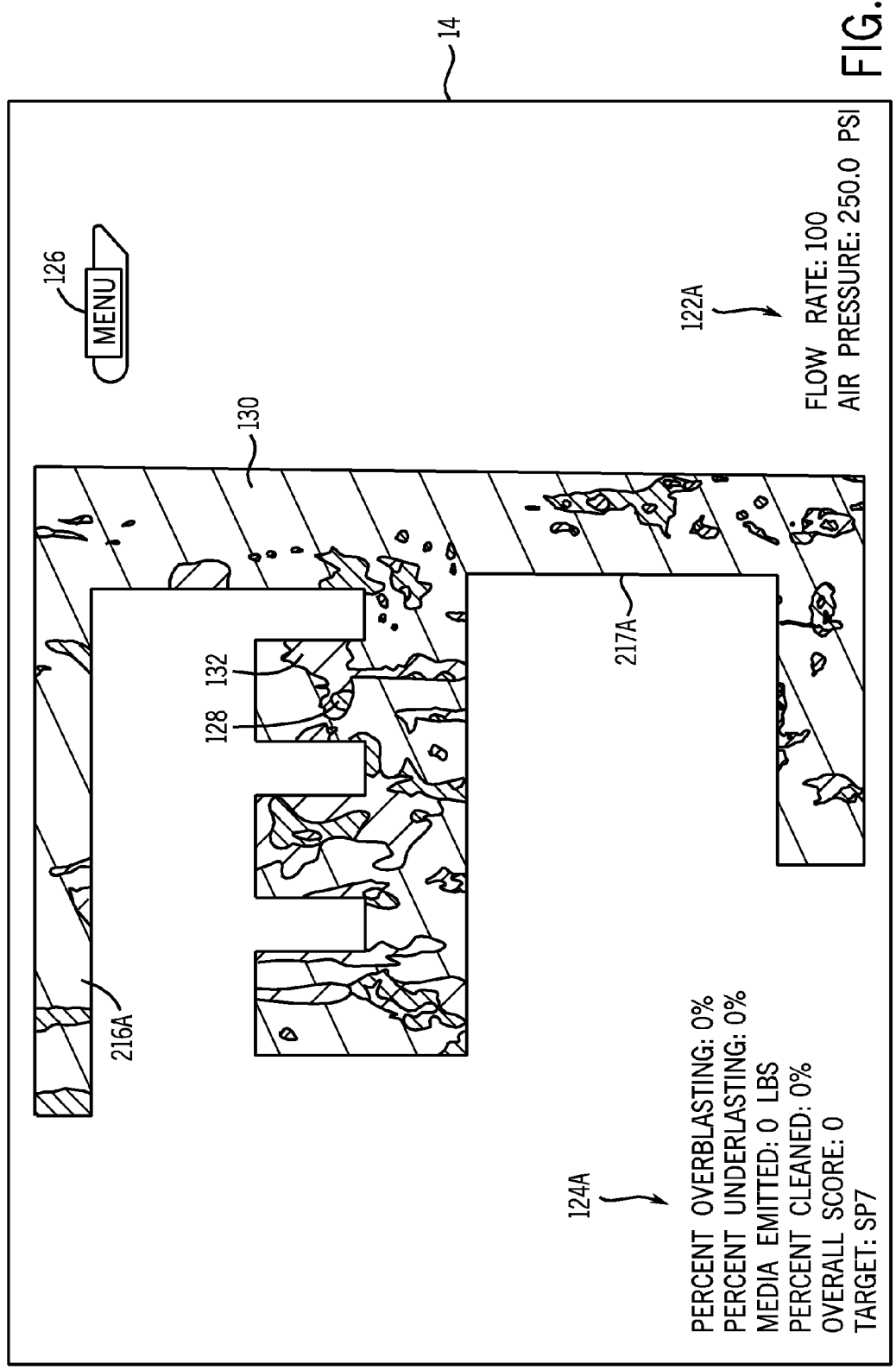

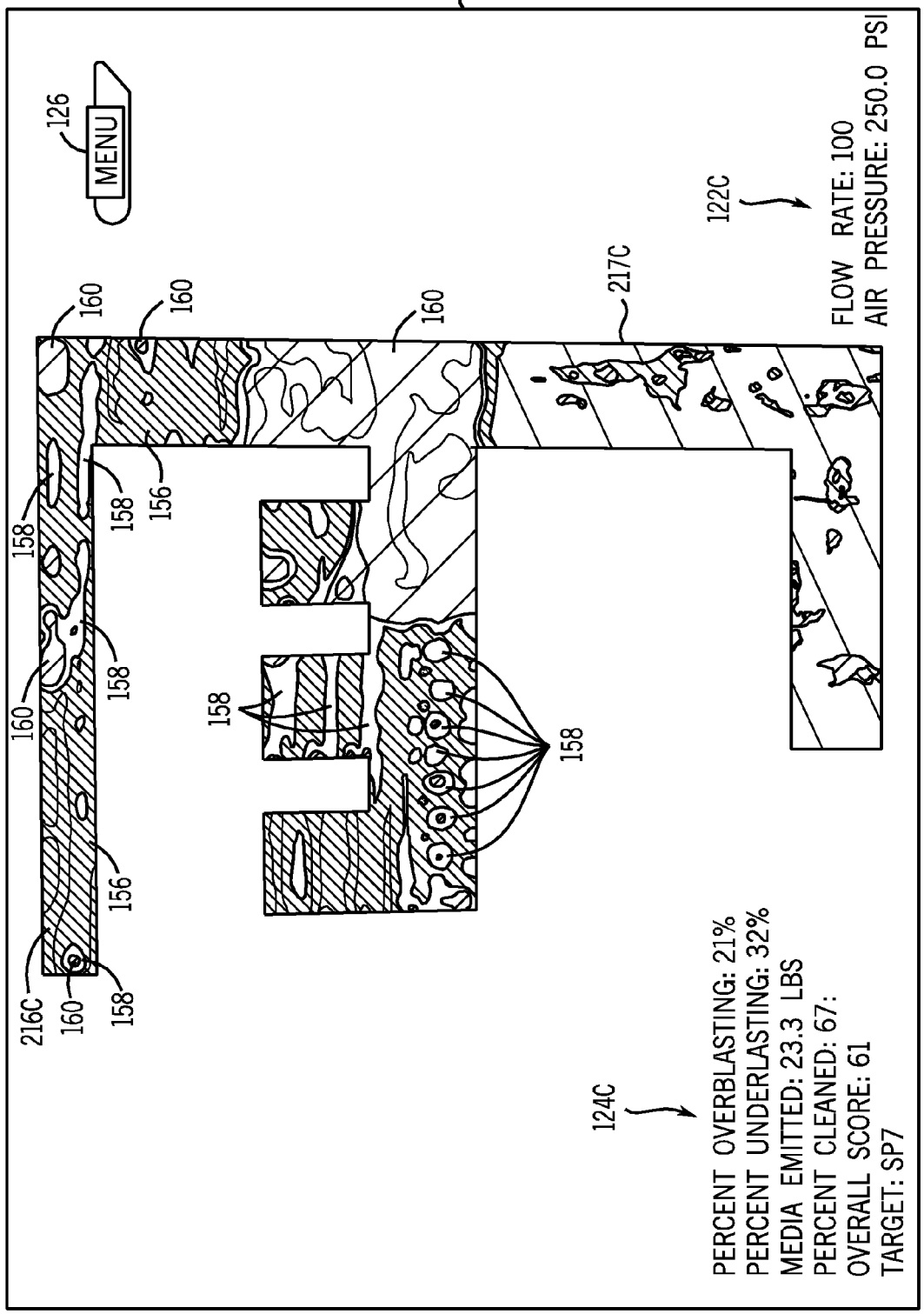

VIRTUAL BLASTING SYSTEM FOR REMOVAL OF COATING AND/OR RUST FROM A VIRTUAL SURFACE

FIELD OF THE INVENTION

The invention relates to training methods and systems for the removal of coatings, such as paint, and/or rust from an underlying surface using blasting media. In particular, the invention relates to the use of computer simulation virtual reality systems in order to facilitate training of proper blasting techniques.

BACKGROUND OF THE INVENTION

In order to remove coatings and/or rust from an underlying surface, industry is moving away from the use of chemical stripping agents and towards the use of blasting techniques. With these blasting techniques, abrasive or non-abrasive media or water are blasted onto the surface at high velocity to remove the coating(s) or rust. There are a wide variety of blasting nozzles and blasting media on the market. The most widely used blasting systems use pressurized blasting media, whereas other systems use a suction feed in which the blasting media is fed into a high velocity air stream via suction. Suction feed systems do not typically have as much power as a pressurized blasting media system. Commonly used blasting media includes silica (i.e. sand), plastic, glass or water, but there is also a wide range of specialized blasting media ranging from steel shot, on the one hand, to cornstarch or soy bean media on the other.

In a typical setup, the user holds the blasting nozzle over their shoulder and blasts the media towards the workpiece. The distance that the blasting nozzle is from the workpiece is commonly referred to in the trade as "standoff" distance. The standoff distance is important because it regulates the velocity of the blasting media as it impacts the coated or rusted surface. The angular orientation of the blasting nozzle with respect to the coated or rusted surface is also important because the rate of removal varies significantly with respect to the angle of attack.

Typically, the user aims the high velocity jet containing the entrained blasting material at the surface until the coating or rust is removed at that spot. The user then moves the jet across the surface in an up and down or back and forth motion in order to remove the coating from the surface. Once the coating(s) and/or rust are removed, the user should continue until the underlying surface is properly cleaned, although care should be taken not to damage the underlying surface. In the field, matching templates are used to rate the cleanliness of the surface once the paint and/or rust layers have been removed.

When the user starts a job, the user might not know the thickness of the coating, or the amount of rust, and therefore must guess based on experience and trial and error as to the appropriate standoff distance and orientation angle. If the nozzle is too close or not tilted enough with respect to the surface, the impact of the blasting media may cause pitting to the surface. On the other hand, if the standoff distance is too great or the tilt too large, the blasting media may not have enough impact to remove the coating or rust.

It can be difficult for a person using a blasting nozzle to keep the nozzle at the optimum distance and orientation from the surface in order to properly remove coatings and rust without damaging the underlying surface. This can be especially difficult for novices. The ideal standoff distance and orientation is normally dependent on the type of blasting material, the supplied pressure, as well as the characteristics of the underlying surface and coating. Training and practical experience helps novices improve their skills, however, hands-on training is time-consuming, labor-intensive and expensive. These factors have made training of large groups, such as military personnel or industrial contractors, impractical. As a practical matter, hands-on training tends to limit the number of techniques that can be practiced and evaluated, especially with respect to multiple coatings, and different types of blasting media.

The assignee of the present application is also the assignee of three pending patent applications relating to the use of computer simulation and virtual reality for training and analyzing proper spray painting techniques. The first pending application is application Ser. No. 11/372,714, Publication No. US2007/0209585A1, entitled "Virtual Coatings Application System" by Ebensberger et al., filed on Mar. 10, 2006 and incorporated by reference herein. The virtual coatings application system disclosed in this pending application generally includes a display screen on which is defined a virtual surface (such as a truck door) that is intended to be virtually painted or coated by the user. The user operates an instrumented spray gun controller that outputs one or more signals representing data as to the status of the controls on the spray gun controller, for example, the position of the trigger, the paint flow rate and the pattern fan size. The system also has a motion tracking system that tracks the position and orientation of the spray gun controller with respect to the virtual surface defined on the display screen. Simulation software in the computer, preferably a desktop or laptop PC, generates virtual spray pattern data in response to at least the data from the spray gun controller and the position orientation data received from the tracking system. A virtual spray pattern image is displayed in real time on the display screen in accordance with the accumulation of virtual spray pattern data at each location on the virtual surface. The paint model is preferably based on empirical data collected from actual spray patterns generated for various spray gun settings. The preferred model simulates coverage distribution in an elliptical pattern in which the inner elliptical radii for width and height define an area of constant rate of coverage and the outer elliptical radii for width and height define the outer extent to which the rate of coverage becomes negligible. The total finish flow rate per unit time (i.e. per software timing cycle) is determined by the settings on the spray gun controller as well as its monitored orientation with respect to the virtual surface, and is distributed over the virtual surface via random number generation in accordance with the above-described elliptical distribution pattern. Each location on the virtual surface has an associated alpha channel which controls transparency of the coating at that location (e.g. pixel) based on accumulation of virtual spray at the given location, thus realistically simulating fade-in or blending for partial coverage on the virtual surface.

Another pending application, application Ser. No. 11/539,352, Publication No. US2007/0209586A1, entitled "Virtual Coatings Application System" filed on Oct. 6, 2006, assigned to the assignee of the present invention and also incorporated herein by reference, further discloses an immersive system in which the user wears a head-mounted display unit that virtually places the user in a three-dimensional virtual spray painting environment. The three-dimensional virtual environment provided to the user by the head-mounted display contains a three-dimensional depiction of the virtual surface to be painted, and also preferably contains a depiction of a spray gun simulating the position and orientation of the instrumented spray gun controller with respect to the virtual surface. In this system, the tracking system also tracks the position and orientation of the head-mounted display unit in order to provide the appropriate perspective to the user in the immersive environment. In this system, it is especially useful for the user controls to be accessible from within the immersive environment so that the user does not have to remove the head-mounted display unit. This is accomplished by providing menu icons within the immersive environment that can be activated and controlled by the instrumented spray gun controller.

Another relevant copending application, application Ser. No. 11/563,842 entitled "Virtual Coatings Application System With Structured Training And Remote Instructor Capabilities", filed on Nov. 28, 2006, assigned to the assignee of the present invention and also incorporated herein by reference, relates to software that facilitates structured training of planned lesson curriculum and enhanced network capabilities that allow students to view an instructor demonstrating technique in a remote location. Spray painting virtual reality training systems commercially offered by the assignee often include the features described in all three of these copending patent applications, although some systems do not incorporate all of the features.

SUMMARY OF THE INVENTION

The invention is a computer simulation and virtual blasting system for the removal of one or more coatings and/or rust from a virtual surface. A primary object of the present invention is to provide a virtual blasting system that realistically simulates the blasting experience for the user. In the preferred embodiment, the system generally includes a display screen on which is defined a virtual surface (such as a flat sheet of metal) that is initially covered with the one or more coatings and/or rust portions. The user operates an electronic controller in the form of a blasting nozzle that outputs a signal indicating whether the blasting nozzle controller is in an "on" position or in an "off" position. The system also has a motion tracking system that tracks the position and orientation of the blasting nozzle controller with respect to the virtual surface defined on the display screen. Simulation software in a computer, preferably a desktop or laptop PC, generates a virtual blast pattern data in response to at least the position and orientation data received from the tracking system and the signal indicating whether the blasting nozzle controller is in the "on" position or in the "off" position. The removal of the one or more coatings and/or rust images on the virtual surface is displayed in real time on the display in accordance with the effect of the virtual blast pattern data at each location on the virtual surface.

In another aspect of the invention, the preferred system can also simulate pitting damage which may occur to the underlying virtual surface, e.g., in case of rust corrosion. The color of the underlying virtual surface in the preferred system adjusts in order to represent the cleanliness of the underlying surface after the one or more coatings and/or rust have been removed. The preferred system also includes a multi-color assessment mode that indicates whether a given area on the virtual surface has been blasted an appropriate amount or overblasted or underblasted.

In another aspect of the preferred embodiment of the invention, the simulation software includes a blasting model that outputs virtual blast intensity that is calculated as a function of at least the standoff distance and angular orientation of the blasting nozzle controller relative to the virtual surface, the supplied virtual air pressure, the type of blasting media, and the abrasive flow rate. The blasting model is preferably based on empirical data collected from blasting patterns generated for various actual blasting conditions. The preferred model distributes blasting intensity via a random number generator in accordance with a combination of a radial gradient and a linear gradient. The radial gradient follows a generally circular pattern in which the inner circular radius defines an area of constant blasting intensity, and the outer circular radius defines the outer extent at which blasting intensity becomes negligible. Preferably, the blasting intensity in the area between the inner and outer radius falls off linearly between the inner and outer radius. The linear gradient, on the other hand, depends on the angle of attack.

The realism of the simulation is enhanced in the preferred embodiment by providing an animation of media bounce back from the virtual surface, and also preferably providing flickers in the animation representing removed coating chips and/or rust. The system also preferably allows the user to select whether to play audio simulating the noise of the blasting process. The preferred system includes loudspeakers that are driven by digital recordings of actual blasting, if this feature is toggled on.

The preferred blasting nozzle controller has a switch that is activated by a hand-held lever (e.g. a dead man's handle) on the controller which indicates whether the controller is in an "on" position or in an "off" position. A tracking sensor (or sensors) is (are) also preferably mounted to the blasting nozzle controller. Otherwise, the blasting nozzle controller is similar and preferably a retrofit or replica of an actual blasting nozzle typically used in the field.

The preferred tracking system is a hybrid inertial and acoustic, six degree of freedom tracking system. Preferably, a combined inertial and acoustic sensor is mounted on the blasting nozzle controller to sense linear and angular momentum as well as ultrasonic signals generated by a series of ultrasonic transmitters mounted above or adjacent the virtual workspace in front of the display screen. The preferred tracking system provides accurate six degree of freedom (x, y, z, pitch, yaw and roll) tracking data, and is well suited to avoid interference that can corrupt data with other types of tracking system. The signals from the sensors on the blasting nozzle controller are preferably sent to the computer via a serial connection for use by simulation software and/or graphics engine software. The blasting nozzle controller can be attached to an actual compressed air hose to further enhance the realism of the simulation.

In another aspect of the preferred embodiment of the invention, the system includes a graphical user interface, e.g. a software screen displayed on a computer monitor that allows the user to select setup parameters and settings for the blasting nozzle controller, as well as view performance criteria, and toggle on or off various optional features of the system. In addition, it is preferred that the screen on which the virtual surface is displayed, e.g. projection screen in a 2-D system or a head-mounted display screen in a 3-D immersive system, also include one or more icons set apart from the displayed virtual surface which can be activated by the user pointing the blasting nozzle controller at the icon and holding the blasting nozzle is in the "on" position.

In yet another aspect of the invention, the system can simulate the use of a laser targeting and positioning system such as is disclosed in copending U.S. patent application Ser. No. 11/334,270, entitled "Light Beam Targeting and Positioning System For A Paint Removal Blasting System", by Richard J. Klein, II, filed on Jan. 18, 2006, and assigned to the assignee of the present invention, incorporated herein by reference. Such systems propagate two converging light or laser beams from a blasting nozzle onto a surface to provide a visual aid for positioning the blasting nozzle at the proper standoff distance from and orientation with the surface. In the present invention, the graphical user interface preferably allows the user to select whether the system should simulate the use of such a targeting and positioning system.

In addition, the features of the invention can be incorporated into a system also having the features described in the above incorporated copending patent applications, or can alternatively be used as a stand-alone system. In this regard, many of the features described in the copending incorporated patent applications such as the use of enhanced software capabilities that enable structured training via planned lesson curriculum, enhanced network capabilities that allow students to view an instructor demonstrating technique from a remote location, or the use of a head-mounted display unit to provide an immersive virtual reality environment, are able to be used in connection with the virtual blasting system described herein.

Various other aspects and features of the invention should be apparent to those skilled in the art upon reviewing the following drawings and description thereof.

BRIEF DESCRIPTION OF THE DRAWINGS

FIG. 8 depicts the preferred graphical user interface appearing on a computer monitor running the virtual blasting system.

FIGS. 10A-10E illustrate a two-dimensional image of a metal part defining a virtual surface with a coating of paint and/or rust on the surface, displayed on a projection screen in accordance with the preferred embodiment of the invention, where FIGS. 10B and 10C illustrate the part being partially blasted in regular mode and assessment mode, respectively, and FIGS. 10D and 10E illustrate the part being fully blasted in regular and assessment mode, respectively.

DETAILED DESCRIPTION OF THE INVENTION

Figure 1:
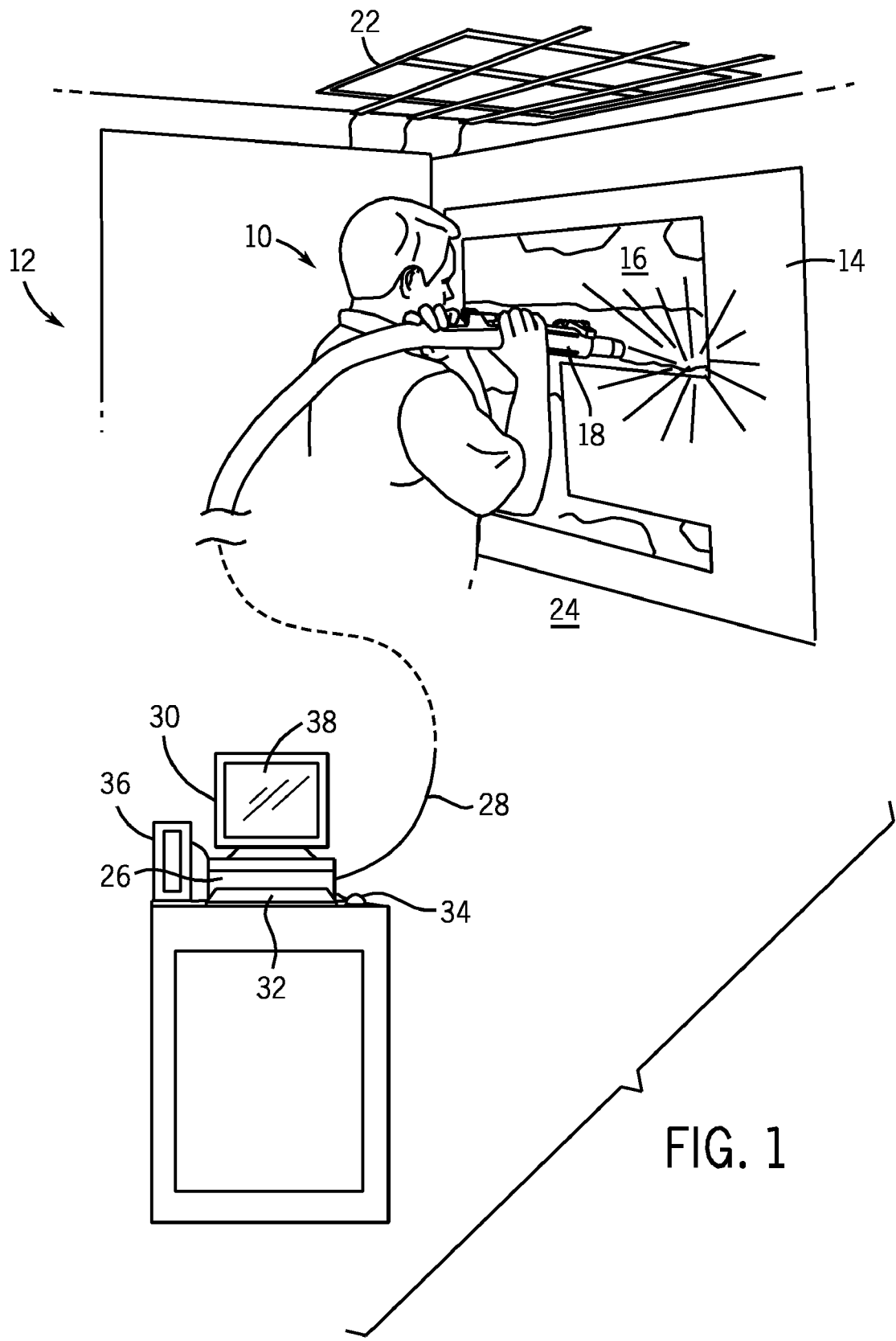
FIG. 1 is a schematic drawing illustrating a person using a virtual blasting system for removing coatings and/or rust from a virtual surface in accordance with a preferred embodiment of the invention.

FIG. 1 shows a person 10 using a virtual blasting system 12 for removing coatings and/or rust from a virtual surface in accordance with the invention. The virtual blasting system 12 is intended to be used to teach blasting techniques by allowing the user to repeat the process an unlimited amount of times without any part preparation or media expenditure. The system 12 helps students learn the best approach for blasting techniques, and can be used to screen potential students for their general skills and abilities. By using the virtual blasting system 12 as part of a normal training routine, a student can gain valuable experience and sharpen blasting techniques. The system 12 works well for beginners as well as experienced blasting technicians.

The virtual blasting system 12 includes a display screen 14, preferably on a large projection screen television, although other types of display screens can be used. A 72-inch screen (measured on the diagonal) provides a suitable amount of virtual workspace, although an 86-inch screen is preferred. The system 12 defines a virtual surface 16 on the front surface of the display screen 14. The user 10 is holding a blasting nozzle controller 18, and is operating the controller 18 to remove virtual coatings and/or virtual rust from the virtual surface defined on the screen 14. The position and orientation of the blasting nozzle controller 18 with respect to the virtual surface 16 on the screen display 14 is monitored using a tracking system, preferably a six degree of freedom tracking system that monitors translation in the x, y and z direction, as well as pitch, yaw and roll. The preferred tracking system is a hybrid inertial and ultrasonic tracking system, as described in more detail hereinafter and in co-pending patent application Ser. No. 11/372,714 incorporated by reference above, although many aspects of the invention may be implemented using other types of tracking technologies. The preferred inertial and ultrasonic tracking system is desired because it minimizes electrical interference present with other types of commercially available tracking systems. FIG. 1 schematically depicts an arrangement of ultrasonic transmitters mounted to a frame 22 extending over the space in front of the display screen 14. The space in front of the display screen 14 on which the virtual surface is located is referred to herein as the virtual workspace 24.

Alternatively, although not preferred, it may be desirable to provide an immersive system in which the user wears a head-mounted display unit as described in the above incorporated U.S. application Ser. No. 11/539,352, except modified as necessary to implement the blasting simulation as described herein in contrast to a spray painting simulation as described in the incorporated pending patent application.

The blasting nozzle controller 18 is connected to a computer 26 preferably via USB cable connection 28. A monitor 30, keyboard 32 and mouse 34 are connected to the computer 26, as well as one or more loudspeakers 36. The virtual blasting system 12 preferably includes a graphical user interface 38 that is displayed on the computer monitor 30.

Figure 2:
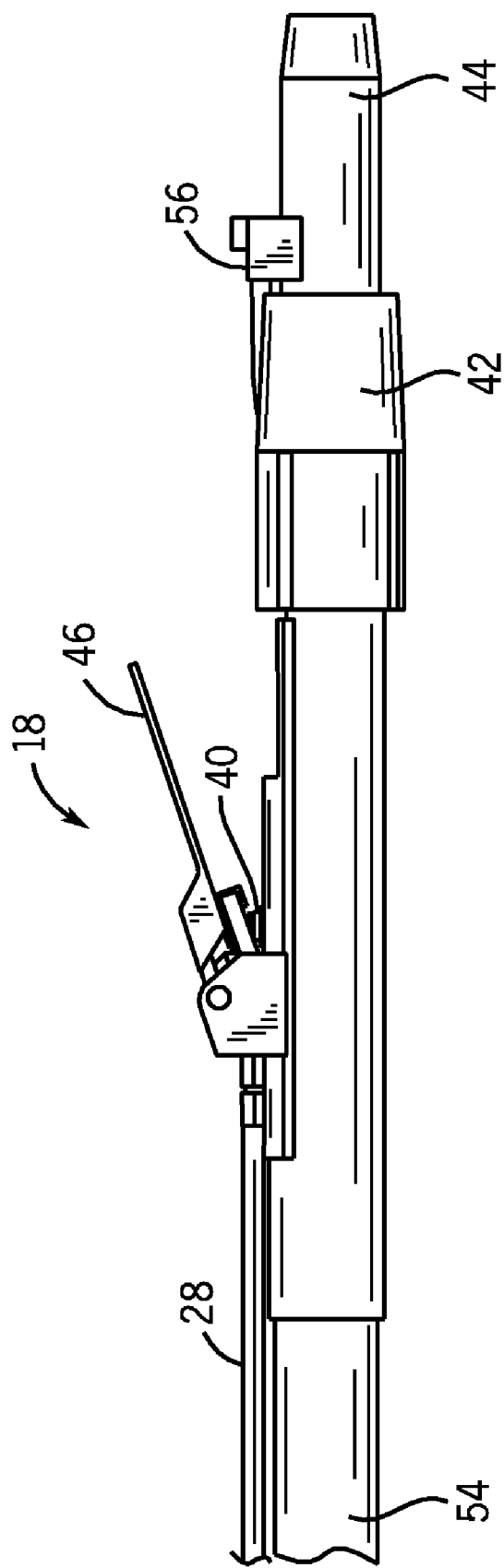
FIG. 2 is a side elevational view of a blasting nozzle controller used in the virtual blasting system of FIG. 1.

FIG. 2 shows the preferred blasting nozzle controller 18 in detail. The controller 18 is preferably a retrofitted actual blasting nozzle for a pressurized blasting system. It should be understood, however, that the system 12 can be adapted in accordance with the invention to simulate other kinds of blasting systems such as suction-based blasting systems, etc. Referring to FIG. 2, the controller 18 has an electronic switch 40 that is normally used to turn an air compressor on and off in an actual blasting nozzle for a pressurized blasting system. The controller 18 uses the electrical output from the switch 40 to signal the virtual blasting system whether the controller 18 is in an "on" position or an "off" position. The preferred blasting nozzle controller 18 also includes a barrel portion 42 and a tip 44 which is coaxially aligned with the nozzle. A hand-operated lever 46 (i.e. a dead man's handle) is mounted to the blasting nozzle hose 54, and is used to activate the switch 40. If the blasting nozzle controller 18 were an actual blasting nozzle, the opening of the tip 44 would expel a high velocity jet of blasting material when the lever handle 46 was held closed. In an actual blasting system, pressurized air and blasting media would be fed to the nozzle via a pressurized feed line, such as depicted by hose 54 connected to the blasting nozzle barrel 42. The position of the handle 46 is sensed by the switch 40. The switch 40 is normally open, and a spring biases the handle lever 46 so that the switch 40 remains open unless the handle 46 is depressed downward. A closed switch 40 indicates that the blasting nozzle is in an "on" position, whereas an open switch 40 indicates that the blasting nozzle is in an "off" position. The signal from the switch 40 is transmitted to the computer 26 via a USB cable connection 28. A suitable USB connection kit can be purchased from CH Products in Vista, Calif.

As mentioned above, the preferred blasting nozzle controller 18 is also instrumented with a hybrid inertial and ultrasonic sensor 56, which is mounted to a top surface of the blasting nozzle controller 18. The preferred inertial and ultrasonic sensor 56 is supplied along with other components of the tracking system from InterSense, Inc. of Bedford, Mass. The preferred sensor is the InterSense IS-900PC Minitrax™ tracker device. The sensor includes accelerometers and gyroscopes for inertial measurement and a microphone for measuring ultrasonic signals from the series of ultrasonic transmitters mounted on frame 22, FIG. 1. The preferred arrangement of ultrasonic transmitters consists of a SoniFrame™ emitter with two 6-foot SoniStrips™ and one 4-foot SoniStrip™ from InterSense, and provides a tracking volume of approximately 2.0 m×2.0 m×3.0 m for the virtual workspace 24. The tracking system uses hybrid inertial and ultrasonic tracking technologies substantially disclosed in U.S. Pat. No. 6,176,837, which is incorporated herein by reference. The ultrasonic transmitters 22 receive timing signals from tracking software in the computer 26. The sensor microphone 56 detects high frequency signals from the ultrasonic transmitters and the sensor accelerometers and gyroscope devices generate inertial position and orientation data. The inertial measurements provide smooth and responsive sensing of motion, but accumulation of noise in these signals can cause drift. The ultrasonic measurements are used to correct such drift. The sensor 56 located on the blasting nozzle controller 18 outputs a six degree of freedom signal, namely x, y, z for linear directions and pitch, yaw and roll for angular directions. The signals from the sensor 56 are transmitted through a cable which is fed through the controller 18 where it is connected to the USB cable 28. The position and orientation of the sensor 56 is determined based on software in the computer 26, thus determining the position and orientation of the blasting nozzle controller 18 in the virtual workspace 24 in front of the display screen surface 16. While it is possible for connections from the controller 18 to the computer 26 to be wireless, it is preferred to run the USB cable 28 for 6 to 10 feet in order to simulate a pressurized feed hose 54 on an actual blasting nozzle.

Figure 3:
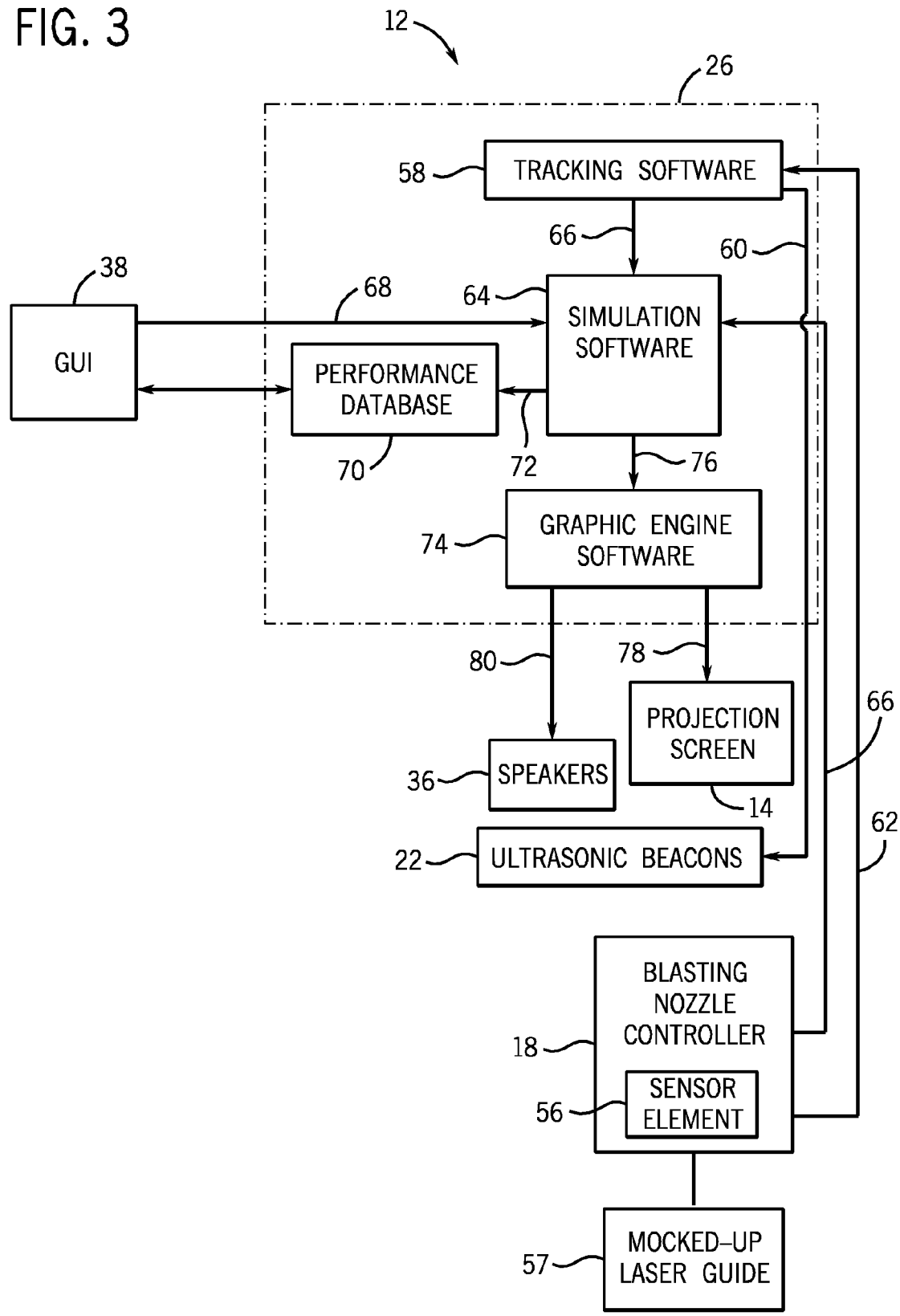
FIG. 3 is a block diagram showing the elements and data flow of a virtual blasting system in accordance with the preferred embodiment of the invention.

Although not shown in FIG. 2, the controller 18 also may include a mock-up laser targeting and positioning system, shown schematically by reference number 57 in FIG. 3. The function of an actual laser targeting and positioning system is simulated using a reverse projection display method. Actual laser targeting and positioning systems for a blasting nozzle are described in the incorporated copending patent application "Light Beam Targeting And Positioning System For A Paint Removal And Blasting System", application Ser. No. 11/334,270, filed on Jan. 18, 2006, assigned to the assignee of the present application, now U.S. Pat. No. 7,270,593. In its preferred form, such a system uses a reference light beam projecting forward from the blasting nozzle onto the surface and also projects a non-parallel guide beam onto the surface. The user of the blasting nozzle aims the center of the jet of blasting media at the spot illuminated by the reference beam, and determines whether the blasting nozzle is at the proper orientation and standoff distance from the surface (thus controlling impact velocity) by determining whether the illuminated points have converged or are aligned. In the virtual blasting system 12, software within the computer 26 models the illumination of the points for the laser or light beam targeting and positioning system based on the position and orientation data, and illuminates those points on the virtual surface 16.

FIG. 3 is an overall block diagram showing components of the virtual blasting system 12 and the flow of information between the various components. Software for the system 12 operating on the computer 26, FIG. 3, controls the operation of the system 12. Block 58 in FIG. 3 depicts the tracking software loaded on the computer 26. The preferred tracking software, as mentioned earlier, is provided by InterSense, Inc. of Bedford, Mass. The tracking software 58 outputs signals to the ultrasonic beacons 22, as shown by line 60. The ultrasonic beacons 22 transmit ultrasonic signals that are detected by the sensor element 56 on the blasting nozzle controller 18. The sensor element 56, as mentioned previously, also includes inertial sensor elements. The blasting nozzle controller 18, and in particular the tracking sensor element 56, sends six degree of freedom tracking data to the tracking software 58 via line 62. The preferred InterSense tracking system has a positional resolution of 0.75 millimeters and an orientation resolution of 0.05°, a static accuracy for position RMS of 2.0 to 3.0 millimeters, and static accuracy for orientation RMS of 0.25° for pitch and roll, and 0.50° for yaw. The interface update rate is 100 to 130 Hz, and the minimum latency is typically four milliseconds.

Based on the six degree of freedom signal that is transmitted to the tracking software via line 62, the tracking software 58 outputs position and orientation data to the simulation software 64. As described in more detail in U.S. Pat. No. 6,176,837, incorporated herein by reference, the tracking software 64 determines the position and orientation data with advanced Kalman filter algorithms that combine the output of the inertial sensors with range measurements obtained from the ultrasonic components. Arrow 66 depicts the six degree of freedom position and orientation data being sent from the tracking software 58 to the simulation software 64. (As discussed in co-pending and incorporated patent application Ser. No. 11/563,842, an immersive 3-D system would also include a sensor that sends position and orientation data of the head-mounted display unit to the tracking software 58.) The simulation software 64 also receives information, arrow 65, directly from the blasting nozzle controller 18 regarding whether the blasting nozzle is in an "on" position or an "off" position, as well as information regarding system set up from the graphical user interface 38, see arrow 68. Generally speaking, the simulation software 64 feeds calculated information to a performance database 70, arrow 72, and to graphic engine software 74, arrow 76. In practice, the preferred system 12 actually involves several separate flows of information from the simulation software 64 to the graphical engine software 74 and the performance database 70. The graphic engine software 74 outputs data that drives images on the projection screen 14 (depicted by arrow 76) as well as data that drives loudspeakers 36 (depicted by arrow 80). On the projection screen 14, the system 12 will show real time three-dimensional graphics illustrating the virtual surface 16, and paint and rust layers, as removed throughout a training session. Performance data and current nozzle settings are also preferably displayed on the projection screen 14 throughout training sessions. The preferred graphics engine 74 includes an audio component to load and play audio, as well as support for the six degree of freedom tracking system and support for receiving the signal from the blasting nozzle controller 18. In addition, the graphics engine software 74 includes matrix and vector libraries that are used to calculate positions, orientations, model transformations, intersections, projections, formats and other such datum.

As discussed in the above copending and incorporated patent application Ser. Nos. 11/372,714, 11/539,352 and 11/563,842, when the user 10 launches the virtual blasting system software on the computer 26, the Windows® application programming interface is launched to run the application software. Preferably, the user is required to login before using the system. The system generates a student performance data file for each student that has logged-in on the system, and these student data files are stored as part of the performance database. Once the student 10 is logged-in, the graphical user interface 38 appears on the computer screen 30, and performance data for that session specific to the student is read from and written to the student data file and displayed on the computer screen 30.

The simulation software 64 includes a mathematical blasting model that models the intensity and the distribution pattern of the virtual jet of blasting media impacting the virtual surface for a slice of time, as will be discussed in more detail below. Simulation software 64 also includes a target or visual model 96 (accumulation shader in FIG. 5) which models a two-dimensional image to be displayed on the projection screen 16 as the virtual surface (or alternatively, a three-dimensional image in an immersive system with a head-mounted display unit). Before a training session begins, the visual model models the initial coatings and/or rust along with any exposed underlying surface that are programmed to be virtually displayed. Preferably, the visual models for the virtual surfaces and coatings and rust are supplied in the 3D Studio/DOS*3.ds format. For two-dimensional images, the models are flat along the z axis. Software can be developed for this application in the c++ programming language using Microsoft® Visual Studio®.

The mathematical blasting model in the simulation software predicts beam shape and beam intensity of the blasting media based on standoff distance and angle of the blasting nozzle controller 18 relative to the virtual surface, as well as supplied air pressure, media type (hard, medium, soft) and media flow rate. For each timing cycle, the intensity of the impacting media is determined from empirical data, preferably as follows:

| Air Pressure | Media Rate | Beam Shape | Beam Intensity | Pattern Width and Removal Rate |
|---|---|---|---|---|
| Distance 6" Angle 90 Abrasive Soft | | | | |
| 75 PSI | 20% | 1" × 1" | 50% | ¾"-6"/second |
| 100 PSI | 20% | 1" × 1" | 65% | ¾"-8"/second |
| 125 PSI | 20% | 1" × 1" | 75% | ¾"-10"/second |
| 75 | 50% | 1" × 1" | 80% | ¾"-8"/second |
| 100 | 50% | 1" × 1" | 85% | ¾"-10"/second |
| 125 | 50% | 1" × 1" | 90% | ¾"-12"/second |
| 75 | 80% | 1" × 1" | 100% | ¾"-10"/second |
| 100 | 80% | 1" × 1" | 100% | ¾"-12"/second |
| 125 | 80% | 1" × 1" | 100% | ¾"-14"/second |

-continued

| Air Pressure | Media Rate | Beam Shape | Beam Intensity | Pattern Width and Removal Rate |
|---|---|---|---|---|
| Distance 6" Angle 60 Abrasive Soft | | | | |
| 75 PSI | 20% | 1" × 1" | 50% | ¾"-7"/second |
| 100 PSI | 20% | 1" × 1" | 65% | ¾"-9"/second |
| 125 PSI | 20% | 1" × 1" | 75% | ¾"-11"/second |
| 75 PSI | 50% | 1" × 1" | 80% | ¾"-9"/second |
| 100 PSI | 50% | 1" × 1" | 85% | ¾"-11"/second |
| 125 PSI | 50% | 1" × 1" | 90% | ¾"-13"/second |
| 75 PSI | 80% | 1" × 1" | 100% | ¾"-11"/second |
| 100 PSI | 80% | 1" × 1" | 100% | ¾"-13"/second |
| 125 PSI | 80% | 1" × 1" | 100% | ¾"-15"/second |
| Distance 6" Angle 30 Abrasive Soft | | | | |
| 75 PSI | 20% | 1" × 1" | 50% | ¾"-5"/second |
| 100 PSI | 20% | 1" × 1" | 65% | ¾"-7"/second |
| 125 PSI | 20% | 1" × 1" | 75% | ¾"-9"/second |
| 75 PSI | 50% | 1" × 1" | 80% | ¾"-7"/second |
| 100 PSI | 50% | 1" × 1" | 85% | ¾"-9"/second |
| 125 PSI | 50% | 1" × 1" | 90% | ¾"-11"/second |
| 75 PSI | 80% | 1" × 1" | 100% | ¾"-9"/second |
| 100 PSI | 80% | 1" × 1" | 100% | ¾"-11"/second |
| 125 PSI | 80% | 1" × 1" | 100% | ¾"-13"/second |
| Distance 6" Angle 90 Abrasive Hard | | | | |
| 75 PSI | 20% | 1" × 1" | 70% | ¾"-8"/second |
| 100 PSI | 20% | 1" × 1" | 80% | ¾"-10"/second |
| 125 PSI | 20% | 1" × 1" | 90% | ¾"-12"/second |
| 75 PSI | 50% | 1" × 1" | 100% | ¾"-10"/second |
| 100 PSI | 50% | 1" × 1" | 100% | ¾"-12"/second |
| 125 PSI | 50% | 1" × 1" | 100% | ¾"-14"/second |
| 75 PSI | 80% | 1" × 1" | 100% | ¾"-12"/second |
| 100 PSI | 80% | 1" × 1" | 100% | ¾"-14"/second |
| 125 PSI | 80% | 1" × 1" | 100% | ¾"-16"/second |
| Distance 6" Angle 60 Abrasive Hard | | | | |
| 75 PSI | 20% | 1" × 1" | 70% | ¾"-10"/second |
| 100 PSI | 20% | 1" × 1" | 80% | ¾"-12"/second |
| 125 PSI | 20% | 1" × 1" | 90% | ¾"-14"/second |
| 75 PSI | 50% | 1" × 1" | 100% | ¾"-12"/second |
| 100 PSI | 50% | 1" × 1" | 100% | ¾"-14"/second |
| 125 PSI | 50% | 1" × 1" | 100% | ¾"-16"/second |
| 75 PSI | 80% | 1" × 1" | 100% | ¾"-14"/second |
| 100 PSI | 80% | 1" × 1" | 100% | ¾"-16"/second |
| 125 PSI | 80% | 1" × 1" | 100% | ¾"-18"/second |
| Distance 6" Angle 30 Abrasive Hard | | | | |
| 75 PSI | 20% | 1" × 1" | 70% | ¾"-6"/second |
| 100 PSI | 20% | 1" × 1" | 80% | ¾"-8"/second |
| 125 PSI | 20% | 1" × 1" | 90% | ¾"-10"/second |
| 75 PSI | 50% | 1" × 1" | 100% | ¾"-8"/second |
| 100 PSI | 50% | 1" × 1" | 100% | ¾"-10"/second |
| 125 PSI | 50% | 1" × 1" | 100% | ¾"-12"/second |
| 75 PSI | 80% | 1" × 1" | 100% | ¾"-10"/second |
| 100 PSI | 80% | 1" × 1" | 100% | ¾"-12"/second |
| 125 PSI | 80% | 1" × 1" | 100% | ¾"-14"/second |
| Distance 12 Angle 90 Abrasive Soft | | | | |
| 75 PSI | 20% | 1.75" × 1.75" | 40% | 1.25"-4"/second |
| 100 PSI | 20% | 1.75" × 1.75" | 55% | 1.25"-6"/second |
| 125 PSI | 20% | 1.75" × 1.75" | 65% | 1.25"-8"/second |
| 75 PSI | 50% | 1.75" × 1.75" | 70% | 1.25"-6"/second |
| 100 PSI | 50% | 1.75" × 1.75" | 75% | 1.25"-8"/second |
| 125 PSI | 50% | 1.75" × 1.75" | 80% | 1.25"-10"/second |

-continued

| Air Pressure | Media Rate | Beam Shape | Beam Intensity | Pattern Width and Removal Rate |
|---|---|---|---|---|
| 75 PSI | 80% | 1.75" × 1.75" | 85% | 1.25"-8"/second |
| 100 PSI | 80% | 1.75" × 1.75" | 90% | 1.25"-10"/second |
| 125 PSI | 80% | 1.75" × 1.75" | 100% | 1.25"-12"/second |
| | | Distance 12 | | |
| | | Angle 60 | | |
| | | Abrasive Soft | | |
| 75 PSI | 20% | 1.75" × 1.75" | 40% | 1.25"-5"/second |
| 100 PSI | 20% | 1.75" × 1.75" | 55% | 1.25"-7"/second |
| 125 PSI | 20% | 1.75" × 1.75" | 65% | 1.25"-9"/second |
| 75 PSI | 50% | 1.75" × 1.75" | 70% | 1.25"-7"/second |
| 100 PSI | 50% | 1.75" × 1.75" | 75% | 1.25"-9"/second |
| 125 PSI | 50% | 1.75" × 1.75" | 80% | 1.25"-11"/second |
| 75 PSI | 80% | 1.75" × 1.75" | 85% | 1.25"-9"/second |
| 100 PSI | 80% | 1.75" × 1.75" | 90% | 1.25"-11"/second |
| 125 PSI | 80% | 1.75" × 1.75" | 100% | 1.25"-13"/second |
| | | Distance 12 | | |
| | | Angle 30 | | |
| | | Abrasive Soft | | |
| 75 PSI | 20% | 1.75" × 1.75" | 40% | 1.25"-3"/second |
| 100 PSI | 20% | 1.75" × 1.75" | 55% | 1.25"-5"/second |
| 125 PSI | 20% | 1.75" × 1.75" | 65% | 1.25"-7"/second |
| 75 PSI | 50% | 1.75" × 1.75" | 70% | 1.25"-5"/second |
| 100 PSI | 50% | 1.75" × 1.75" | 75% | 1.25"-7"/second |
| 125 PSI | 50% | 1.75" × 1.75" | 80% | 1.25"-9"/second |
| 75 PSI | 80% | 1.75" × 1.75" | 85% | 1.25"-7"/second |
| 100 PSI | 80% | 1.75" × 1.75" | 90% | 1.25"-9"/second |
| 125 PSI | 80% | 1.75" × 1.75" | 100% | 1.25"-11"/second |
| | | Distance 12 | | |
| | | Angle 90 | | |
| | | Abrasive Hard | | |
| 75 PSI | 20% | 1.75" × 1.75" | 60% | 1.25"-6"/second |
| 100 PSI | 20% | 1.75" × 1.75" | 70% | 1.25"-8"/second |
| 125 PSI | 20% | 1.75" × 1.75" | 80% | 1.25"-10"/second |
| 75 PSI | 50% | 1.75" × 1.75" | 90% | 1.25"-8"/second |
| 100 PSI | 50% | 1.75" × 1.75" | 100% | 1.25"-10"/second |
| 125 PSI | 50% | 1.75" × 1.75" | 100% | 1.25"-12"/second |
| 75 PSI | 80% | 1.75" × 1.75" | 100% | 1.25"-10"/second |
| 100 PSI | 80% | 1.75" × 1.75" | 100% | 1.25"-12"/second |
| 125 PSI | 80% | 1.75" × 1.75" | 100% | 1.25"-14"/second |
| | | Distance 12 | | |
| | | Angle 60 | | |
| | | Abrasive Hard | | |
| 75 PSI | 20% | 1.75" × 1.75" | 60% | 1.25"-8"/second |
| 100 PSI | 20% | 1.75" × 1.75" | 70% | 1.25"-0"/second |
| 125 PSI | 20% | 1.75" × 1.75" | 80% | 1.25"-12"/second |
| 75 PSI | 50% | 1.75" × 1.75" | 90% | 1.25"-10"/second |
| 100 PSI | 50% | 1.75" × 1.75" | 100% | 1.25"-12"/second |
| 125 PSI | 50% | 1.75" × 1.75" | 100% | 1.25"-14"/second |
| 75 PSI | 80% | 1.75" × 1.75" | 100% | 1.25"-12"/second |
| 100 PSI | 80% | 1.75" × 1.75" | 100% | 1.25"-14"/second |
| 125 PSI | 80% | 1.75" × 1.75" | 100% | 1.25"-16"/second |
| | | Distance 12 | | |
| | | Angle 30 | | |
| | | Abrasive Hard | | |
| 75 PSI | 20% | 1.75" × 1.75" | 60% | 1.25"-4"/second |
| 100 PSI | 20% | 1.75" × 1.75" | 70% | 1.25"-6"/second |
| 125 PSI | 20% | 1.75" × 1.75" | 80% | 1.25"-8"/second |
| 75 PSI | 50% | 1.75" × 1.75" | 90% | 1.25"-6"/second |
| 100 PSI | 50% | 1.75" × 1.75" | 100% | 1.25"-8"/second |
| 125 PSI | 50% | 1.75" × 1.75" | 100% | 1.25"-10"/second |
| 75 PSI | 80% | 1.75" × 1.75" | 100% | 1.25"-8"/second |
| 100 PSI | 80% | 1.75" × 1.75" | 100% | 1.25"-10"/second |
| 125 PSI | 80% | 1.75" × 1.75" | 100% | 1.25"-12"/second |
| | | Distance 18 | | |
| | | Angle 90 | | |
| | | Abrasive Soft | | |
| 75 PSI | 20% | 2.5" × 2.5" | 30% | 2"-2"/second |
| 100 PSI | 20% | 2.5" × 2.5" | 45% | 2"-4"/second |
| 125 PSI | 20% | 2.5" × 2.5" | 55% | 2"-6"/second |

-continued

| Air Pressure | Media Rate | Beam Shape | Beam Intensity | Pattern Width and Removal Rate |
|---|---|---|---|---|
| 75 PSI | 50% | 2.5" × 2.5" | 60% | 2"-4"/second |
| 100 PSI | 50% | 2.5" × 2.5" | 65% | 2"-6"/second |
| 125 PSI | 50% | 2.5" × 2.5" | 70% | 2"-8"/second |
| 75 PSI | 80% | 2.5" × 2.5" | 75% | 2"-6"/second |
| 100 PSI | 80% | 2.5" × 2.5" | 80% | 2"-8"/second |
| 125 PSI | 80% | 2.5" × 2.5" | 90% | 2"-10"/second |
| | | Distance 18 | | |
| | | Angle 60 | | |
| | | Abrasive Soft | | |
| 75 PSI | 20% | 2.5" × 2.5" | 30% | 2"-3"/second |
| 100 PSI | 20% | 2.5" × 2.5" | 45% | 2"-5"/second |
| 125 PSI | 20% | 2.5" × 2.5" | 55% | 2"-7"/second |
| 75 PSI | 50% | 2.5" × 2.5" | 60% | 2"-5"/second |
| 100 PSI | 50% | 2.5" × 2.5" | 65% | 2"-7"/second |
| 125 PSI | 50% | 2.5" × 2.5" | 70% | 2"-9"/second |
| 75 PSI | 80% | 2.5" × 2.5" | 75% | 2"-7"/second |
| 100 PSI | 80% | 2.5" × 2.5" | 80% | 2"-9"/second |
| 125 PSI | 80% | 2.5" × 2.5" | 90% | 2"-11"/second |
| | | Distance 18 | | |
| | | Angle 30 | | |
| | | Abrasive Soft | | |
| 75 PSI | 20% | 2.5" × 2.5" | 30% | 2"-1"/second |
| 100 PSI | 20% | 2.5" × 2.5" | 45% | 2"-3"/second |
| 125 PSI | 20% | 2.5" × 2.5" | 55% | 2"-5"/second |
| 75 PSI | 50% | 2.5" × 2.5" | 60% | 2"-3"/second |
| 100 PSI | 50% | 2.5" × 2.5" | 65% | 2"-5"/second |
| 125 PSI | 50% | 2.5" × 2.5" | 70% | 2"-7"/second |
| 75 PSI | 80% | 2.5" × 2.5" | 75% | 2"-5"/second |
| 100 PSI | 80% | 2.5" × 2.5" | 80% | 2"-7"/second |
| 125 PSI | 80% | 2.5" × 2.5" | 90% | 2"-9"/second |
| | | Distance 18 | | |
| | | Angle 90 | | |
| | | Abrasive Hard | | |
| 75 PSI | 20% | 2.5" × 2.5" | 50% | 2"-4"/second |
| 100 PSI | 20% | 2.5" × 2.5" | 60% | 2"-6"/second |
| 125 PSI | 20% | 2.5" × 2.5" | 70% | 2"-8"/second |
| 75 PSI | 50% | 2.5" × 2.5" | 80% | 2"-6"/second |
| 100 PSI | 50% | 2.5" × 2.5" | 90% | 2"-8"/second |
| 125 PSI | 50% | 2.5" × 2.5" | 100% | 2"-10"/second |
| 75 PSI | 80% | 2.5" × 2.5" | 100% | 2"-8"/second |
| 100 PSI | 80% | 2.5" × 2.5" | 100% | 2"-10"/second |
| 125 PSI | 80% | 2.5" × 2.5" | 100% | 2"-12"/second |
| | | Distance 18 | | |
| | | Angle 60 | | |
| | | Abrasive Hard | | |
| 75 PSI | 20% | 2.5" × 2.5" | 50% | 2"-6"/second |
| 100 PSI | 20% | 2.5" × 2.5" | 60% | 2"-8"/second |
| 125 PSI | 20% | 2.5" × 2.5" | 70% | 2"-10"/second |
| 75 PSI | 50% | 2.5" × 2.5" | 80% | 2"-8"/second |
| 100 PSI | 50% | 2.5" × 2.5" | 90% | 2"-10"/second |
| 125 PSI | 50% | 2.5" × 2.5" | 100% | 2"-12"/second |
| 75 PSI | 80% | 2.5" × 2.5" | 100% | 2"-10"/second |
| 100 PSI | 80% | 2.5" × 2.5" | 100% | 2"-12"/second |
| 125 PSI | 80% | 2.5" × 2.5" | 100% | 2"-14"/second |
| | | Distance 18 | | |
| | | Angle 30 | | |
| | | Abrasive Hard | | |
| 75 PSI | 20% | 2.5" × 2.5" | 50% | 2"-2"/second |
| 100 PSI | 20% | 2.5" × 2.5" | 60% | 2"-4"/second |
| 125 PSI | 20% | 2.5" × 2.5" | 70% | 2"-6"/second |
| 75 PSI | 50% | 2.5" × 2.5" | 80% | 2"-4"/second |
| 100 PSI | 50% | 2.5" × 2.5" | 90% | 2"-6"/second |
| 125 PSI | 50% | 2.5" × 2.5" | 100% | 2"-8"/second |
| 75 PSI | 80% | 2.5" × 2.5" | 100% | 2"-6"/second |
| 100 PSI | 80% | 2.5" × 2.5" | 100% | 2"-8"/second |
| 125 PSI | 80% | 2.5" × 2.5" | 100% | 2"-10"/second |

-continued

| Air Pressure | Media Rate | Beam Shape | Beam Intensity | Pattern Width and Removal Rate |
|---|---|---|---|---|
| | | Distance 24 Angle 90 Abrasive Soft | | |
| 75 PSI | 20% | 3.25" × 3.25" | 20% | 2.75"-1"/second |
| 100 PSI | 20% | 3.25" × 3.25" | 35% | 2.75"-2"/second |
| 125 PSI | 20% | 3.25" × 3.25" | 45% | 2.75"-4"/second |
| 75 PSI | 50% | 3.25" × 3.25" | 50% | 2.75"-2"/second |
| 100 PSI | 50% | 3.25" × 3.25" | 55% | 2.75"-4"/second |
| 125 PSI | 50% | 3.25" × 3.25" | 60% | 2.75"-6"/second |
| 75 PSI | 80% | 3.25" × 3.25" | 65% | 2.75"-4"/second |
| 100 PSI | 80% | 3.25" × 3.25" | 70% | 2.75"-6"/second |
| 125 PSI | 80% | 3.25" × 3.25" | 80% | 2.75"-8"/second |
| | | Distance 24 Angle 90 Abrasive Soft | | |
| 75 PSI | 20% | 3.25" × 3.25" | 20% | 2.75"-1"/second |
| 100 PSI | 20% | 3.25" × 3.25" | 35% | 2.75"-2"/second |
| 125 PSI | 20% | 3.25" × 3.25" | 45% | 2.75"-4"/second |
| 75 PSI | 50% | 3.25" × 3.25" | 50% | 2.75"-2"/second |
| 100 PSI | 50% | 3.25" × 3.25" | 55% | 2.75"-4"/second |
| 125 PSI | 50% | 3.25" × 3.25" | 60% | 2.75"-6"/second |
| 75 PSI | 80% | 3.25" × 3.25" | 65% | 2.75"-4"/second |
| 100 PSI | 80% | 3.25" × 3.25" | 70% | 2.75"-6"/second |
| 125 PSI | 80% | 3.25" × 3.25" | 80% | 2.75"-8"/second |
| | | Distance 24 Angle 30 Abrasive Soft | | |
| 75 PSI | 20% | 3.25" × 3.25" | 20% | 2.75"-1"/second |
| 100 PSI | 20% | 3.25" × 3.25" | 35% | 2.75"-2"/second |
| 125 PSI | 20% | 3.25" × 3.25" | 45% | 2.75"-4"/second |
| 75 PSI | 50% | 3.25" × 3.25" | 50% | 2.75"-2"/second |
| 100 PSI | 50% | 3.25" × 3.25" | 55% | 2.75"-4"/second |
| 125 PSI | 50% | 3.25" × 3.25" | 60% | 2.75"-6"/second |
| 75 PSI | 80% | 3.25" × 3.25" | 65% | 2.75"-4"/second |
| 100 PSI | 80% | 3.25" × 3.25" | 70% | 2.75"-6"/second |
| 125 PSI | 80% | 3.25" × 3.25" | 80% | 2.75"-8"/second |
| | | Distance 24 Angle 90 Abrasive Hard | | |
| 75 PSI | 20% | 3.25" × 3.25" | 40% | 2.75"-2"/second |
| 100 PSI | 20% | 3.25" × 3.25" | 50% | 2.75"-4"/second |
| 125 PSI | 20% | 3.25" × 3.25" | 60% | 2.75"-6"/second |
| 75 PSI | 50% | 3.25" × 3.25" | 70% | 2.75"-4"/second |
| 100 PSI | 50% | 3.25" × 3.25" | 80% | 2.75"-6"/second |
| 125 PSI | 50% | 3.25" × 3.25" | 90% | 2.75"-8"/second |
| 75 PSI | 80% | 3.25" × 325" | 100% | 2.75"-6"/second |
| 100 PSI | 80% | 3.25" × 3.25" | 100% | 2.75"-8"/second |
| 125 PSI | 80% | 3.25" × 3.25" | 100% | 2.75"-10"/second |
| | | Distance 24 Angle 60 Abrasive Hard | | |
| 75 PSI | 20% | 3.25" × 3.25" | 40% | 2.75"-2"/second |
| 100 PSI | 20% | 3.25" × 3.25" | 50% | 2.75"-4"/second |
| 125 PSI | 20% | 3.25" × 3.25" | 60% | 2.75"-6"/second |
| 75 PSI | 50% | 3.25" × 3.25" | 70% | 2.75"-4"/second |
| 100 PSI | 50% | 3.25" × 3.25" | 80% | 2.75"-6"/second |
| 125 PSI | 50% | 3.25" × 3.25" | 90% | 2.75"-8"/second |
| 75 PSI | 80% | 3.25" × 3.25" | 100% | 2.75"-6"/second |
| 100 PSI | 80% | 3.25" × 3.25" | 100% | 2.75"-8"/second |
| 125 PSI | 80% | 3.25" × 3.25" | 100% | 2.75"-10"/second |
| | | Distance 24 Angle 30 Abrasive Hard | | |
| 75 PSI | 20% | 3.25" × 3.25" | 40% | 2.75"-2"/second |
| 100 PSI | 20% | 3.25" × 3.25" | 50% | 2.75"-4"/second |
| 125 PSI | 20% | 3.25" × 3.25" | 60% | 2.75"-6"/second |
| 75 PSI | 50% | 3.25" × 3.25" | 70% | 2.75"-4"/second |
| 100 PSI | 50% | 3.25" × 3.25" | 80% | 2.75"-6"/second |
| 125 PSI | 50% | 3.25" × 3.25" | 90% | 2.75"-8"/second |
| | | Distance 24 Angle 60 Abrasive Hard | | |
| 75 PSI | 20% | 3.25" × 3.25" | 40% | 2.75"-2"/second |
| 100 PSI | 20% | 3.25" × 3.25" | 50% | 2.75"-4"/second |
| 125 PSI | 20% | 3.25" × 3.25" | 60% | 2.75"-6"/second |
| 75 PSI | 50% | 3.25" × 3.25" | 70% | 2.75"-4"/second |
| 100 PSI | 50% | 3.25" × 3.25" | 80% | 2.75"-6"/second |
| 125 PSI | 50% | 3.25" × 3.25" | 90% | 2.75"-8"/second |
| 75 PSI | 80% | 3.25" × 3.25" | 100% | 2.75"-6"/second |
| 100 PSI | 80% | 3.25" × 3.25" | 100% | 2.75"-8"/second |
| 125 PSI | 80% | 3.25" × 3.25" | 100% | 2.75"-10"/second |
| | | Distance 30 Angle 90 Abrasive Soft | | |
| 75 PSI | 20% | 4" × 4" | 10% | 3.5"-.5"/second |
| 100 PSI | 20% | 4" × 4" | 25% | 3.5"-1"/second |
| 125 PSI | 20% | 4" × 4" | 35% | 3.5"-2"/second |
| 75 PSI | 50% | 4" × 4" | 40% | 3.5"-1"/second |
| 100 PSI | 50% | 4" × 4" | 45% | 3.5"-2"/second |
| 125 PSI | 50% | 4" × 4" | 50% | 3.5"-4"/second |
| 75 PSI | 80% | 4" × 4" | 55% | 3.5"-2"/second |
| 100 PSI | 80% | 4" × 4" | 60% | 3.5"-4"/second |
| 125 PSI | 80% | 4" × 4" | 65% | 3.5"-6"/second |
| | | Distance 30 Angle 60 Abrasive Soft | | |
| 75 PSI | 20% | 4" × 4" | 10% | 3.5"-.5"/second |
| 100 PSI | 20% | 4" × 4" | 25% | 3.5"-1"/second |
| 125 PSI | 20% | 4" × 4" | 35% | 3.5"-2"/second |
| 75 PSI | 50% | 4" × 4" | 40% | 3.5"-1"/second |
| 100 PSI | 50% | 4" × 4" | 45% | 3.5"-2"/second |
| 125 PSI | 50% | 4" × 4" | 50% | 3.5"-4"/second |
| 75 PSI | 80% | 4" × 4" | 55% | 3.5"-2"/second |
| 100 PSI | 80% | 4" × 4" | 60% | 3.5"-4"/second |
| 125 PSI | 80% | 4" × 4" | 65% | 3.5"-6"/second |
| | | Distance 30 Angle 30 Abrasive Soft | | |
| 75 PSI | 20% | 4" × 4" | 10% | 3.5"-.5"/second |
| 100 PSI | 20% | 4" × 4" | 25% | 3.5"-1"/second |
| 125 PSI | 20% | 4" × 4" | 35% | 3.5"-2"/second |
| 75 PSI | 50% | 4" × 4" | 40% | 3.5"-1"/second |
| 100 PSI | 50% | 4" × 4" | 45% | 3.5"-2"/second |
| 125 PSI | 50% | 4" × 4" | 50% | 3.5"-4"/second |
| 75 PSI | 80% | 4" × 4" | 55% | 3.5"-2"/second |
| 100 PSI | 80% | 4" × 4" | 60% | 3.5"-4"/second |
| 125 PSI | 80% | 4" × 4" | 65% | 3.5"-6"/second |
| | | Distance 30 Angle 90 Abrasive Hard | | |
| 75 PSI | 20% | 4" × 4" | 30% | 3.5"-1"/second |
| 100 PSI | 20% | 4" × 4" | 40% | 3.5"-2"/second |
| 125 PSI | 20% | 4" × 4" | 50% | 3.5"-4"/second |

-continued

| Air Pressure | Media Rate | Beam Shape | Beam Intensity | Pattern Width and Removal Rate |
|---|---|---|---|---|
| 75 PSI | 50% | 4" × 4" | 60% | 3.5"-2"/second |
| 100 PSI | 50% | 4" × 4" | 70% | 3.5"-4"/second |
| 125 PSI | 50% | 4" × 4" | 80% | 3.5"-6"/second |
| 75 PSI | 80% | 4" × 4" | 90% | 3.5"-4"/second |
| 100 PSI | 80% | 4" × 4" | 100% | 3.5"-6"/second |
| 125 PSI | 80% | 4" × 4" | 100% | 3.5"-8"/second |
| | | Distance 30 Angle 60 Abrasive Hard | | |
| 75 PSI | 20% | 4" × 4" | 30% | 3.5"-1"/second |
| 100 PSI | 20% | 4" × 4" | 40% | 3.5"-2"/second |
| 125 PSI | 20% | 4" × 4" | 50% | 3.5"-4"/second |
| 75 PSI | 50% | 4" × 4" | 60% | 3.5"-2"/second |
| 100 PSI | 50% | 4" × 4" | 70% | 3.5"-4"/second |
| 125 PSI | 50% | 4" × 4" | 80% | 3.5"-6"/second |
| 75 PSI | 80% | 4" × 4" | 90% | 3.5"-4"/second |
| 100 PSI | 80% | 4" × 4" | 100% | 3.5"-6"/second |
| 125 PSI | 80% | 4" × 4" | 100% | 3.5"-8"/second |
| | | Distance 30 Angle 30 Abrasive Hard | | |
| 75 PSI | 20% | 4" × 4" | 30% | 3.5"-1"/second |
| 100 PSI | 20% | 4" × 4" | 40% | 3.5"-2"/second |
| 125 PSI | 20% | 4" × 4" | 50% | 3.5"-4"/second |
| 75 PSI | 50% | 4" × 4" | 60% | 3.5"-2"/second |
| 100 PSI | 50% | 4" × 4" | 70% | 3.5"-4"/second |
| 125 PSI | 50% | 4" × 4" | 80% | 3.5"-6"/second |
| 75 PSI | 80% | 4" × 4" | 90% | 3.5"-4"/second |
| 100 PSI | 80% | 4" × 4" | 100% | 3.5"-6"/second |
| 125 PSI | 80% | 4" × 4" | 100% | 3.5"-8"/second |

Figure 4A:
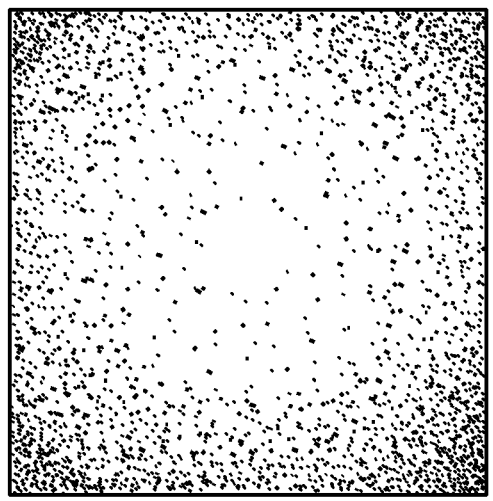
FIGS. 4A-4C illustrate a radial, linear and blended blasting distribution pattern, respectively, as used by the simulation model in accordance with a preferred embodiment of the invention.
Figure 4B:
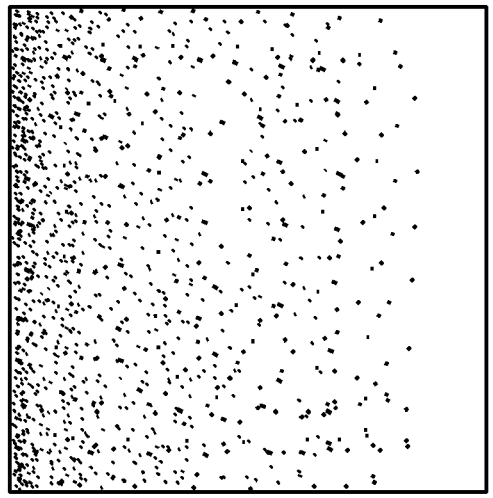
Figure 4C:
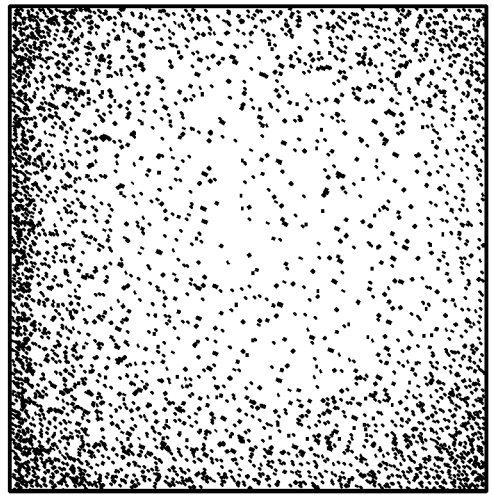

The actual intensity distribution is based on a random number generator over a distribution pattern for each slice of time. Referring to FIGS. 4A-4C, the blasting model assumes two distribution gradients, one radial, FIG. 4A, and one linear, FIG. 4B, which are multiplied together for every point to form a blended pattern, FIG. 4C. The radial gradient model shown in FIG. 4A distributes the media impact power and removal effectiveness (i.e. the intensity) using a circular pattern (or alternatively an elliptical pattern) in which the inner radius defines an area of constant intensity, the outer radius defines the extent to which intensity of the virtual jet becomes negligible, and between the inner radius and the outer radius, the intensity varies linearly with the radius. The outer radius is provided by the above tables. The linear gradient pattern, FIG. 4B, varies linearly in response to the orientation of the controller 18 with respect to the virtual surface, i.e. the intensity gradient changes with respect to the angle of attack. The overall pattern, as mentioned, is a combination of the linear gradient and the radial gradient, and the overall pattern dimensions, FIG. 4C, are modified in accordance with the standoff distance, see "Beam Shape" in the above tables.

The mathematical model compensates for the rotation of the controller 18 by displacing and rotating the coverage pattern, FIG. 4C, and modifying the coverage density according to the collected data. Generally speaking, the pattern as a whole exhibits reduced coverage due to pitch and yaw. Thus, a constant in the extended data structure is returned, which represents the average reduction in coverage density over the area of constant coverage. For pitch and yaw changes through 15° or 20°, the total average density variation only approaches about 4%.

Figure 5:
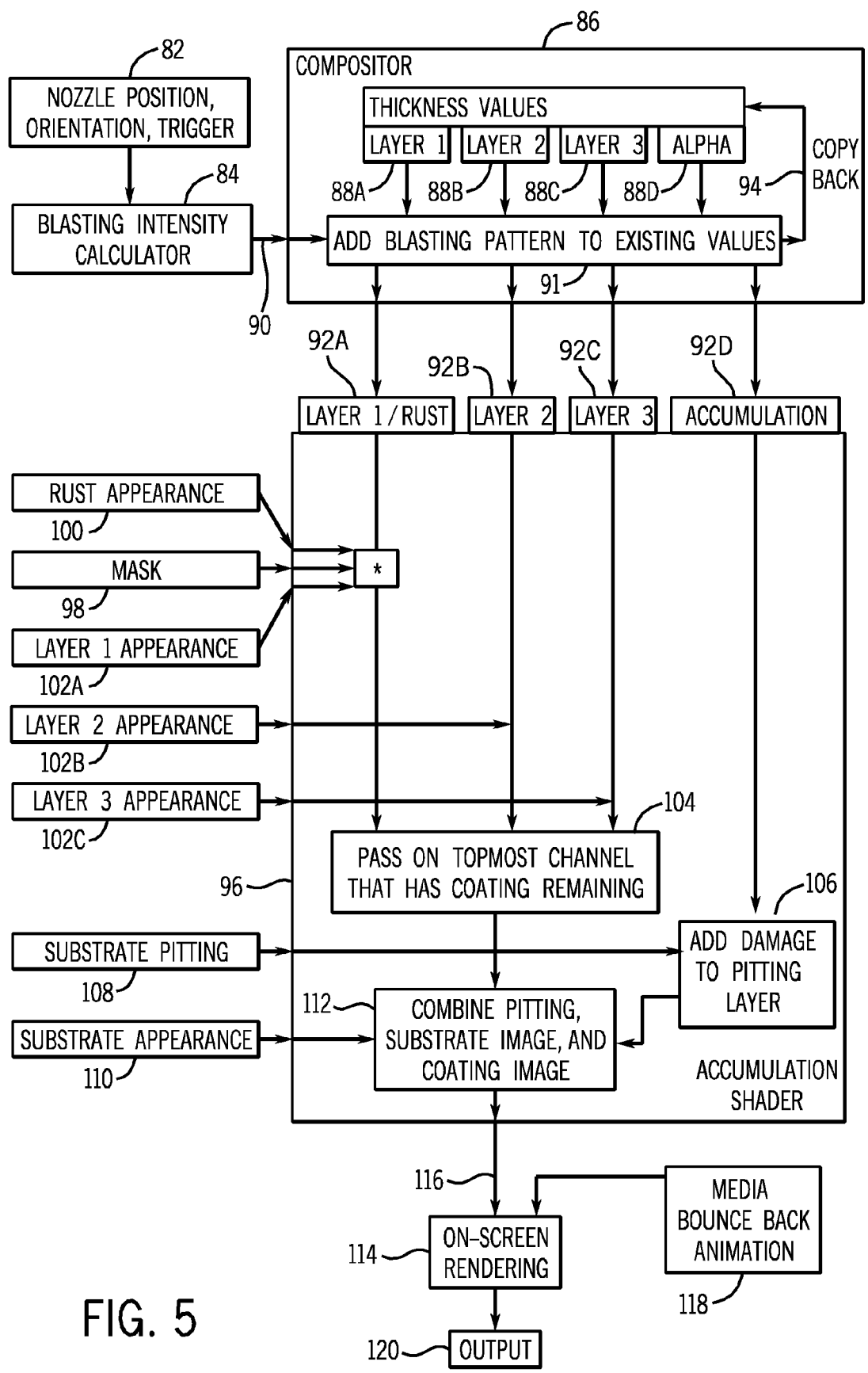
FIG. 5 is a diagram illustrating the preferred software architecture of the system.

The preferred graphics engine 74 is a scene graph-based rendering engine, and in particular, the GRaiL™ graphics engine developed by and available from Southwest Research Institute, San Antonio, Tex., as described in the above incorporated patent application Ser. Nos. 11/372,714 and 11/539,352. FIG. 5 shows the operation of the preferred visual blasting model using GRaiL™. Referring to FIG. 5, the box labeled with reference number 82 indicates generally that data representing the nozzle position, orientation and trigger position are sent to the mathematical blasting model 84. The mathematical blasting model 84 is labeled in FIG. 5 as "blasting intensity calculator", and as described earlier, distributes the intensity from the above look-up tables with the combined radial and linear gradients to determine intensity for every point on the removal pattern per time cycle. This intensity value is then passed to the compositor 86, which is preferably a four channel texture map. Coatings, rust, substrate appearance, substrate pitting, and composition of these elements are modeled as texture maps. Each layer of coating or rust is represented as an individual texture map. These texture maps represent the appearance of the layer, assuming that the entire layer is visible on the part. Removal and display of the layers is managed by the accumulation shader 96. The Layer 1 channel 88A represents the thickness of the first layer and/or rust. The Layer 2 channel 88B represents the thickness of layer 2, and the Layer 3 channel 88C represents the thickness of layer 3. Channel 88D represents the alpha channel, which represents the amount of blasting media to touch the substrate after a predetermined surface condition is reached, in order to determine substrate pitting and substrate appearance as described below. As illustrated in FIG. 5, for each time slice, the compositor 86 draws information from the mathematical blasting model 84, as illustrated by arrow 90. This blasting intensity pattern data 90 is added to the then-current values for each layer as indicated by block 91, and passes values to the off-screen buffer 92A, 92B, 92C, and 92D. The compositor 86 also saves the accumulated values for the next time cycle, see arrow 94. The results of the off screen buffer 92A, 92B, 92C, 92D are applied to the accumulation shader 96 for each time cycle. The texture maps (coating layers, rust, substrate pitting, and composition elements) are shown for that time slice based on the information gathered in the off screen buffer. The accumulation shader 96 displays the appropriate texture map for that time slice depending on the value stored. If there is rust 100 present on the target part, the rust is depicted in layer 1. A mask 98 is used for this purpose. The mask image is white wherever paint layers are on the part, and it is black wherever those areas are covered with rust. The mask 98 does not change during execution of the training lesson, that is, the mask 98 remains static even if paint or rust are removed. Mask 98 having varying degrees of rust can be stored electronically. As shown in FIG. 5, the layer 1 channel 92A is a combination of the rust appearance 100 and the layer 1 coating appearance 102A, as determined by the mask 98. Channel 92B represents the layer 2 coating appearance as shown by box 102B and channel 92C represents the appearance of the layer coating 3 as depicted by box 102C. The accumulation shader 96 combines the channels 92A, 92B and 92C from the off screen buffer, as depicted by box 104. Assuming that the maximum coating thickness is given a value of 10, the display of rust and/or layers of coatings is determined in accordance with the following rules. If the mask is black in an area and the value of the layer 1 channel is less than 10, rust and pitting will be displayed. Note that pitting accumulates via the alpha channel 92D, as illustrated by box 106. If the mask is white, then the accumulation shader will display the topmost coating that is remaining, along with any pitting damage. For example, in a system where there are three layers of paint and no rust, the system will first display layer 3 until layer 3 has been removed, then it will display layer 2 until layer 2 has been removed, and then it will display layer 1 until layer 1 has been removed, at which time it will display the substrate. Box 108 illustrates the initial pitting effect for example due to simulated corrosion from rust. Box 106 shows that additional pitting damage for the time slice is added to the initial substrate pitting 108 per time cycle. Box 110 represents the texture map for the fully cleaned substrate. The pitting layer 106 overlays the substrate layer 110. Box 112 in the accumulation shader 96 indicates that the accumulation shader provides a final texture map that combines the substrate image, the pitting effect, and the coating and/or rust image. This texture map is passed to the onscreen renderer, box 114, as depicted by arrows 116.

Preferably, the animation for the media bounce back simulates paint chips in the media bounce back. In particular, the front and back of the paint chips are different colors so as to simulate the flicker that occurs in actual blasting. The onscreen renderer 114 also receives a media bounce back animation 118. Media bounce back is displayed as an animated texture to approximate the visual appearance of the media and paint flakes bouncing off of the virtual surface. The media bounce back animation 118 is preferably mapped onto a square centered at the intersection of the media stream and the virtual part. The media bounce back animation 118 is alpha blended with the virtual part image to simulate the transparent nature of the bounced media cloud. As shown in FIG. 5, the onscreen renderer 114 draws the virtual work surface with the remaining virtual paint and rust on the surface and the animated media bounce back, and also depicts whether the virtual surface has been pitted. The onscreen renderer is GRaiL's normal rendering path. The onscreen renderer 114 outputs to the open graphics library which controls the display on the projection screen, as illustrated by output box 120.

Figure 6:
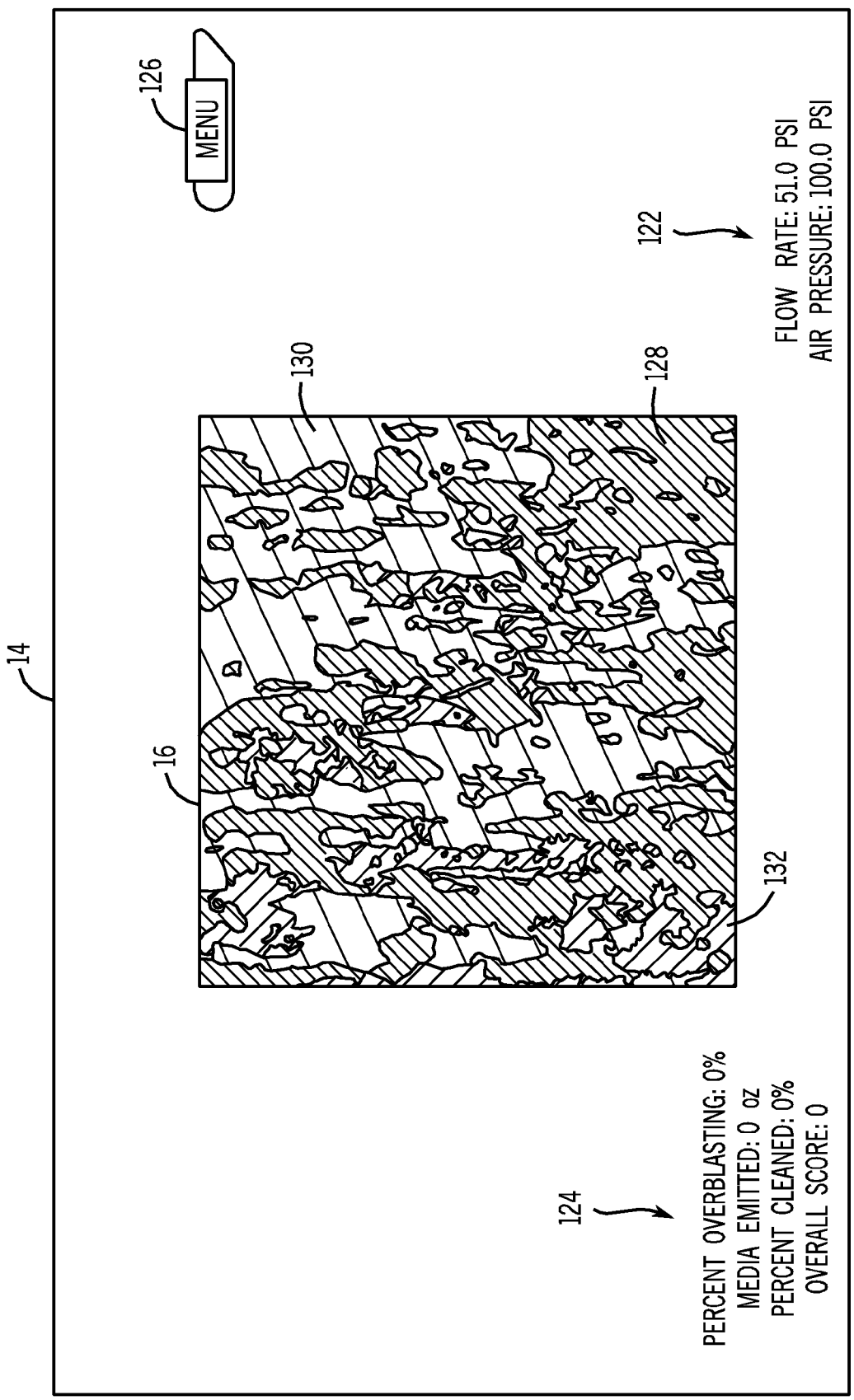
FIG. 6 illustrates a two-dimensional image of a virtual surface partially covered with rust and paint displayed on a projection screen in accordance with the preferred embodiment of the invention.

FIG. 6 illustrates the view on the display screen to a user once the system is set up but before the user begins blasting. The screen 14 shows a virtual work surface 16, system set up information 122, performance monitoring criteria 124, and the menu icon 126. The user can access items in menu 126 by pointing the blasting nozzle controller 18 at the menu icon 126 and closing the handle 46 so that the controller 118 is in the "on" position. Note that the menu icon 126 is separate from and removed from the virtual surface 16. Upon activation of the menu icon 126, a pop up menu appears on the screen 114 similar to that described in copending patent application Ser. No. 11/539,352, which is incorporated herein by reference. Preferably, the pop up menu would provide menu items to turn on or off the audio, to display performance scores, to change controller settings, to display simulated laser guidance, to display the image in assessment mode, to restart the session, or to exit the pop up menu.

The system set up parameters 122 shown on the screen 14 in FIG. 6 are the simulated flow rate and air pressure for the blasting nozzle controller 18. The performance criteria 124 shown on the screen 14 in FIG. 6 are percent overblasting, media emitted, percent cleaned, and overall score. The displayed parameter setups 122 as well as the displayed performance scores 124 can be edited by the user, as described below. The virtual surface 16 in FIG. 6 illustrates areas of rust 128, coating 130 and underlying exposed substrate. Preferably, the user is allowed to select the percentage of rust on the surface, and the system will produce a mask 100 simulating a rust pattern for the appropriate percentage.

Figure 7:
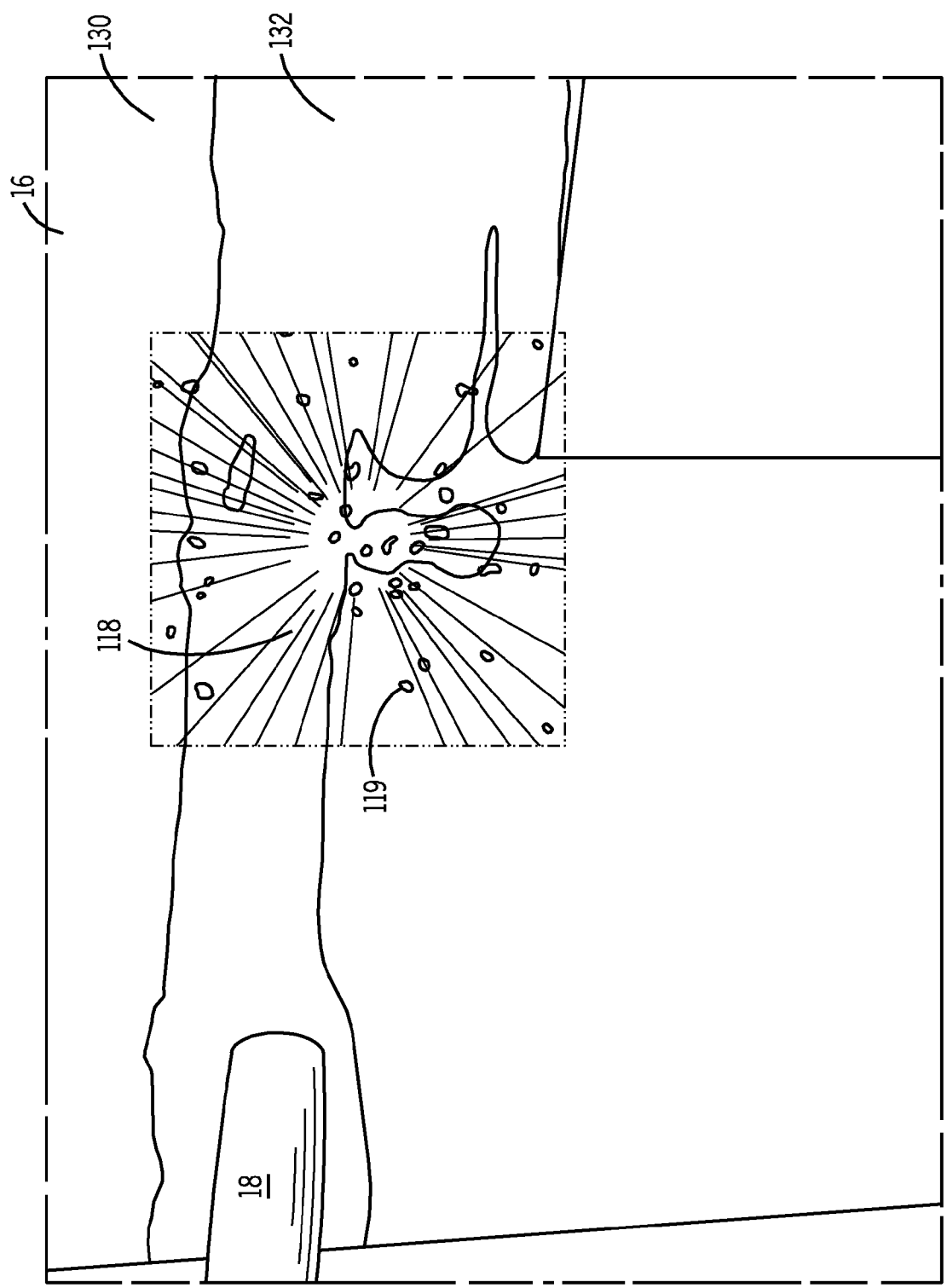
FIG. 7 is a schematic view illustrating operation of the virtual blasting system, and in particular illustrates an animation of the media bounce pack with paint flakes being blended with the image of the virtual paint and/or rust removal on the virtual surface.

FIG. 7 illustrates the system 12 in use with the blasting nozzle controller 18 blasting virtual media on the virtual surface 16. In FIG. 7, the surface is coated without rust. The coating is depicted by reference number 130. Area depicted by reference number 132 constitutes clean virtual surface 16. The media bounce back animation 118 is also illustrated with flakes of paint 119 flickering in the animation. In FIG. 7, there is no rust depicted on the virtual surface.

Referring now to FIG. 8, the preferred graphical user interface 38 prompts the user to login in order to bring up the main screen and to start the training session. Once the user logs in, the user can select between free play mode and training mode, as described in copending patent application Ser. No. 11/563, 842 incorporated herein by reference. The graphical user interface executes within Microsoft Internet Explorer Web Browser and allows the user to log in, choose courses, and administer users, lessons and classes. Note that in one embodiment of the invention, the software provides the ability to choose between a virtual blasting system or a virtual painting system, as disclosed in the above incorporated patents. The preferred graphical user interface also provides screens for selecting lessons within the training mode or the free play mode, and then starting, monitoring and stopping training lessons. FIG. 8 shows an exemplary main screen 134 on the graphical user interface when a blasting lesson is in progress. In this configuration, the surface type is preselected for the lesson, as is the percent of rust on the virtual surface. The user is required to select certain training setup parameters, such as media type 136 (hard, medium or soft), and supplied air pressure 138, media flow rate 140.

The graphical user interface screen 134 also includes several toggle switches. Toggle box 142 labeled "PLAY AUDIO" allows the user to select whether the simulation will include simulated blasting noise in accordance with data from the audio component in the simulation software. In this regard, the system 12 includes one or more speakers 36 and the software interactively generates an output sound signal in response to whether the switch 40 on the blasting nozzle controller 18 has been activated. The output sound signal is provided in real time, preferably with a two second delay for startup, to drive the one or more loudspeakers to simulate the sound of an actual blasting nozzle in use. As mentioned, the simulation software preferably includes digital sound files of actual blasting noise recordings. It has been found that the volume of blasting varies generally proportionally to the supplied air pressure. The software controls the volume of the sound generated by the loudspeakers 36 in accordance with the supplied air pressure setting 138 on the graphical user interface 38.

Box 144 entitled "SHOW CURRENT SCORE" allows the user to choose whether the current performance scores are displayed on the display screen 14 next to the virtual surface 16, such as depicted by reference number 124 in FIG. 6. Box 146 entitled "SHOW SETTINGS" allows the user to choose whether the current controller settings are displayed on the display screen 14 next to the virtual surface 16, such as depicted by reference number 122 in FIG. 6. Having this information 122, 124 displayed on the projection screen 16 puts this information within the scope of vision of the user and provides immediate feedback in a non-distracting manner.

Figure 9B:
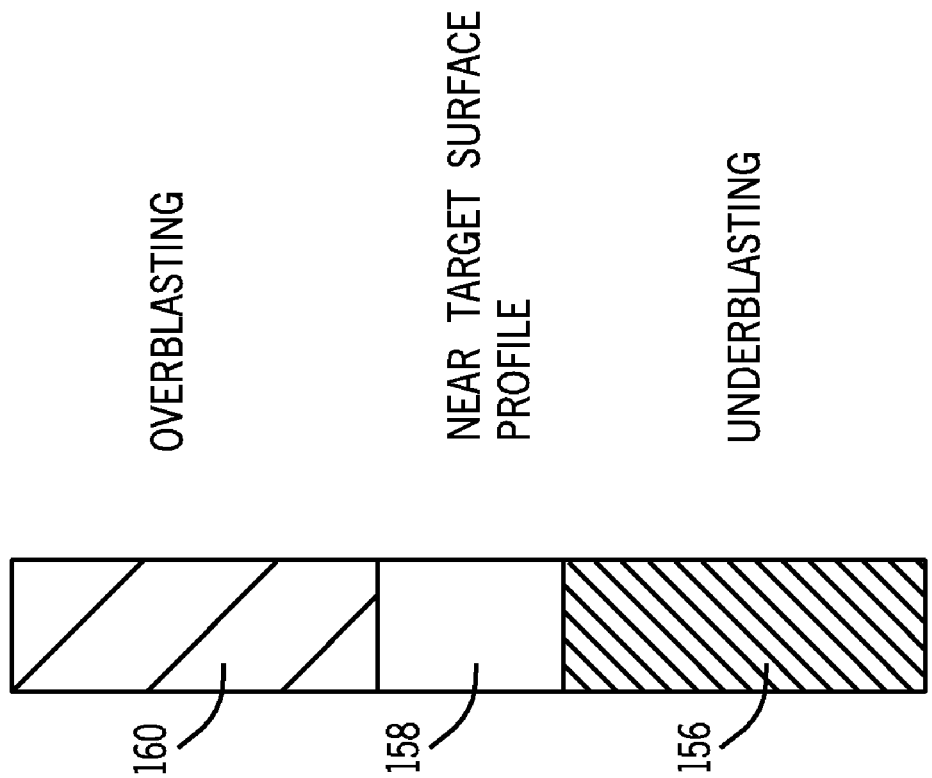
FIGS. 9A and 9B are schematic drawings illustrating the display of surface colors in assessment mode.
Figure 9A:
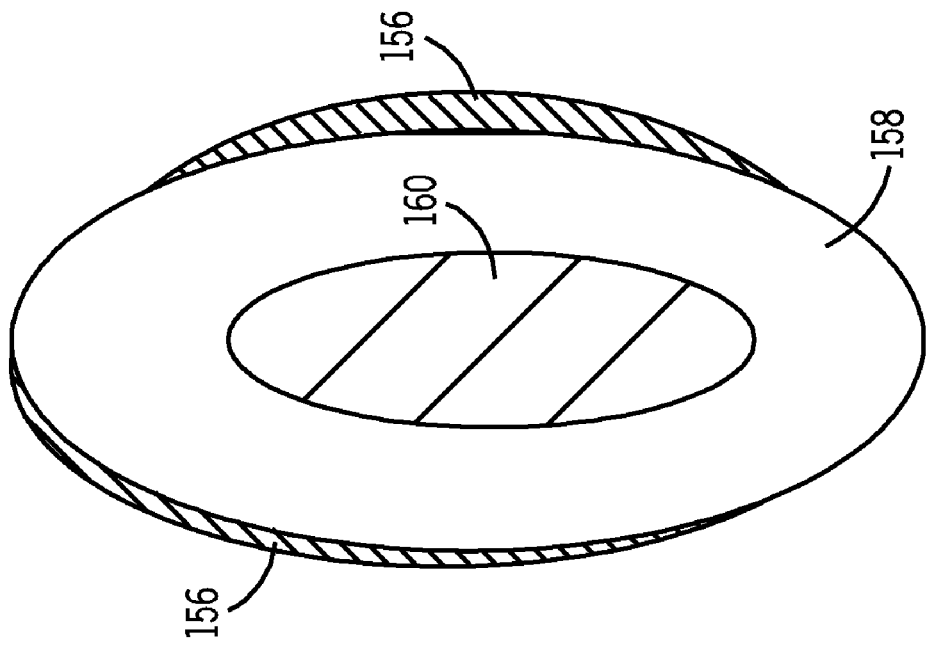

Box 148 in FIG. 8 entitled "SHOW ASSESSMENT" allows the user to choose whether to display the virtual part 16 in a multiple color assessment mode. Referring to FIGS. 9A and 9B, when in assessment display mode, areas with paint or rust are displayed as normal; however, areas with no paint or rust are color coded to represent the amount of excessive blast media to reach the virtual surface. For example, it is preferred that shades of blue 156 represent underblasting, while shades of green 158 represent blasting close to achieving the target surface profile, and shades of red 160 represent overblasting. FIG. 9B illustrates this color coding. FIG. 9A provides an example of how a blasting pattern might look in assessment mode if the controller 18 were moved up and down slightly to form an oval or elliptical pattern. The inner section 160 might be overblasted whereas the outer fringes 156 might be underblasted. The assessment display is created using the accumulation shader 96 in FIG. 5. The accumulation shader is a *.cg file. Note that the user can virtually blast a part on the virtual surface 16 without being in assessment mode, and then change the settings to show assessment display mode on the display screen 14.

Referring again to FIG. 8, box 150 entitled "SHOW LASERGUIDE" on the user interface screen 134 enables the user to select whether the simulation software should model a light or laser targeting and positioning system by illuminating two dots on the virtual surface 16, thus helping the user maintain the blasting nozzle controller 18 in an appropriate position and orientation with respect to the virtual surface. While it may be desirable to outfit the blasting nozzle controller 18 with a mock-up 57, FIG. 3, of an actual laser targeting and positioning system as disclosed in copending U.S. patent application Ser. No. 11/334,270, now U.S. Pat. No. 7,270,593, such a mock-up 57 is not necessary to carry out this aspect of the invention. Preferably, the software generates data to illuminate an image on the projection screen 14 simulating a reference beam hitting the virtual surface 16 as well as a gauge beam hitting the virtual surface. The image for the reference beam is preferably set to be in the center of the virtual jet of blasting media as it impacts the surface whereas the image for the gauge beam depends on the standoff distance and orientation of the controller 18 with respect to the virtual surface 16. Preferably, the image of the reference beam and the image of the gauge beam will converge to a single point at the middle of the blast pattern when the blasting nozzle controller 18 is located at the appropriate distance and orientation with respect to the virtual surface 16. However, the image of the gauge beam on the display screen will depart from the image for the reference beam if the nozzle controller 18 is moved too far too close to the surface 16 or tilted inappropriately. Since the standoff distance between the blasting nozzle controller 18 and the virtual surface is known by the tracking system, as well as the offset between the sources of the imaginary reference beam and the imaginary gauge beam and the angle of attack of the imaginary gauge beam with respect to the imaginary reference beam (via settings on the mocked-up laser guide 57 or the graphical user interface, or assumed default settings), the system is able to calculate the location of the illuminated images for the imaginary reference beam and the imaginary gauge beam on the surface 16 using fundamental trigonomic expressions.

In addition, as previously mentioned, the graphical user interface 38 shown in FIG. 8 displays one or more performance monitoring metrics for the current training session, as well as data summaries for previous training sessions. Note that the display box 152 lists the following information for the current training session: media used, percent cleaned, percent overblasted, percent underblasted, overall score and elapsed time. The performance computations are based on the position and angle of the blasting nozzle controller 18, in accordance with the computer simulation. The performance criteria 124 are preferably defined as: percent overblasting (area with waste media divided by total area of the virtual surface), media emitted in ounces (total blasting media sprayed from nozzle controller 18), percent clean (area without coating or rust divided by total area of virtual surface), and overall score ($100*((X*\%~\text{clean})-(Y*\%~\text{blasted}))$, where X and Y are factors specified in the system configuration file). Box 154 on the screen in FIG. 8 shows summaries of previous performance scores for the logged-in user. The performance data is stored and recalled using the performance database 70, as previously discussed in FIG. 3.

The graphical user interface 38 can also include dropdown menus such as dropdown menus labeled "file", "display" and "tools". Under the dropdown menu for "file", the preferred system includes a restart command which restarts the training session and resets all the performance data, a save to database command which saves the current student scores to the database, a save as file command which saves the current user scores to a specified file, and an exit command which exits from the virtual blast application. The "display" dropdown menu preferably includes a show settings command, a show performance metrics command, a play audio command, a show assessment mode command, a show laser paint command, etc. The "tools" menu preferably includes the calibrate tracker command which starts the tracker calibration mode.

Figure 10B:
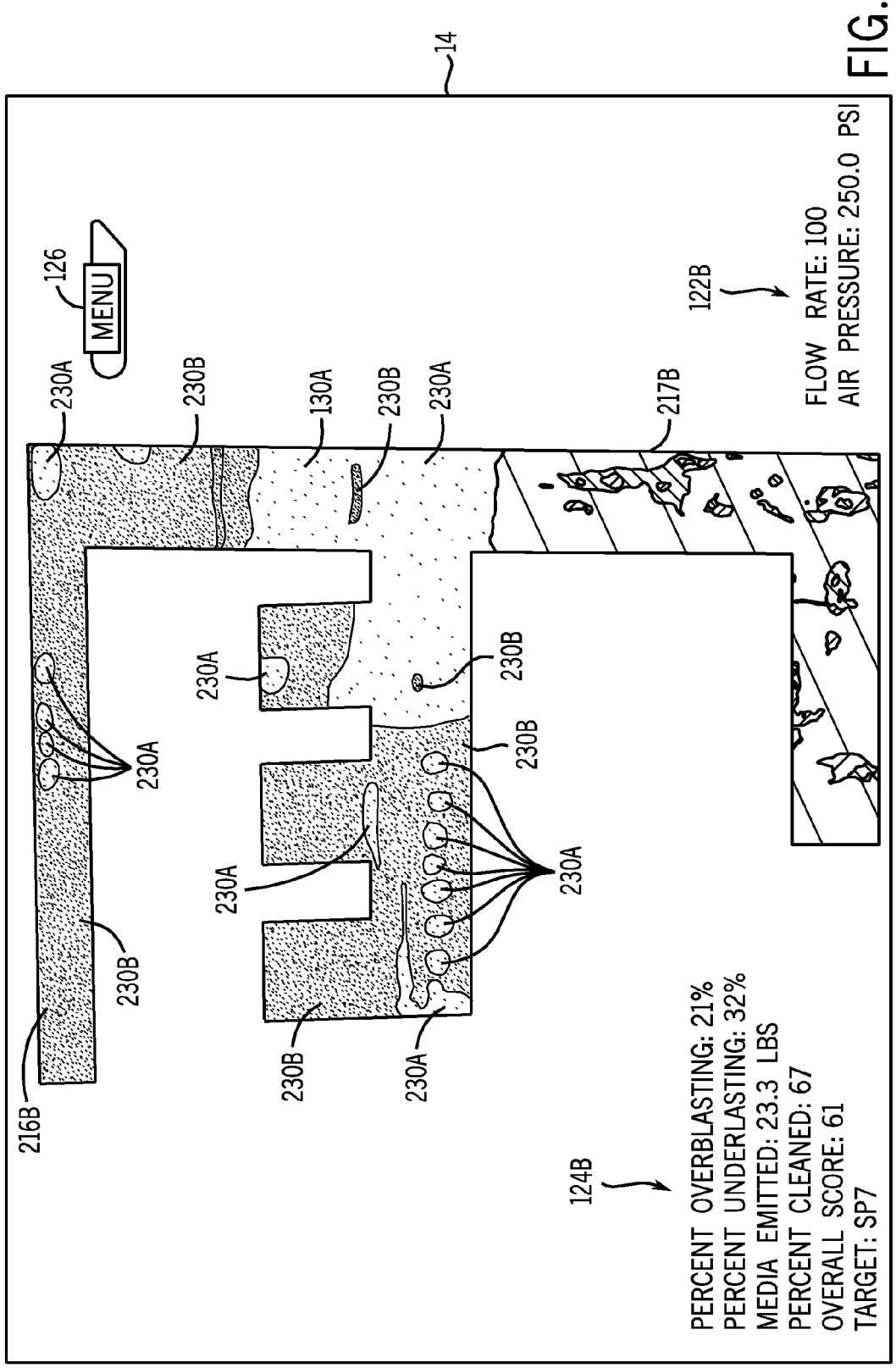

FIGS. 10A-10E illustrate use of the system 12 in the usual course of operation. Referring to FIG. 10A, a virtual part 216A is displayed on the display screen 14 along with user settings 122A and performance criteria 124A as well as the menu icon 126. The virtual part 216A is displayed with coated or painted portions 130, portions with exposed underlying substrate 132, and portions in which the underlying substrate is rusted 128. FIG. 10B illustrates the same virtual part 216B after it has been partially blasted. Note that the lower portion 217B of the virtual part 216B has not been blasted and remains identical to the lower portion 217A in FIG. 10A. The upper portion of part 216B in FIG. 10B has, however, been virtually blasted. Note that the upper portion in FIG. 10B depicted by reference numerals 230A, 230B of virtual part 216B is preferably gray in color in order to simulate an underlying metal substrate. Regions 230A are lighter in color than regions 230B in order to simulate the effect of lightening the underlying surface proportional to the amount of blasting media actually hitting the virtual surface 216B. FIG. 10C shows the same partially blasted part as part 216B in FIG. 10B, except the part 216C shown in FIG. 10C is depicted in assessment mode. Note that the lower portion 217C is identical to the lower portion 217B in FIGS. 10B and 217A in FIG. 10A. This is because, as mentioned above, the assessment mode does not affect areas which have not been virtually blasted. The upper portion of part 216C in FIG. 10C includes blue regions 156 indicating that those regions have been underblasted, green regions 158 indicating that those regions have been blasted at or near the desired target surface profile, and red regions 160 indicating that those areas have been overblasted. Note that the overblasted regions 160 in FIG. 10C generally correspond to the lighter colored regions 230A in FIG. 10B, although this is not necessarily always the case.

Figure 10D:
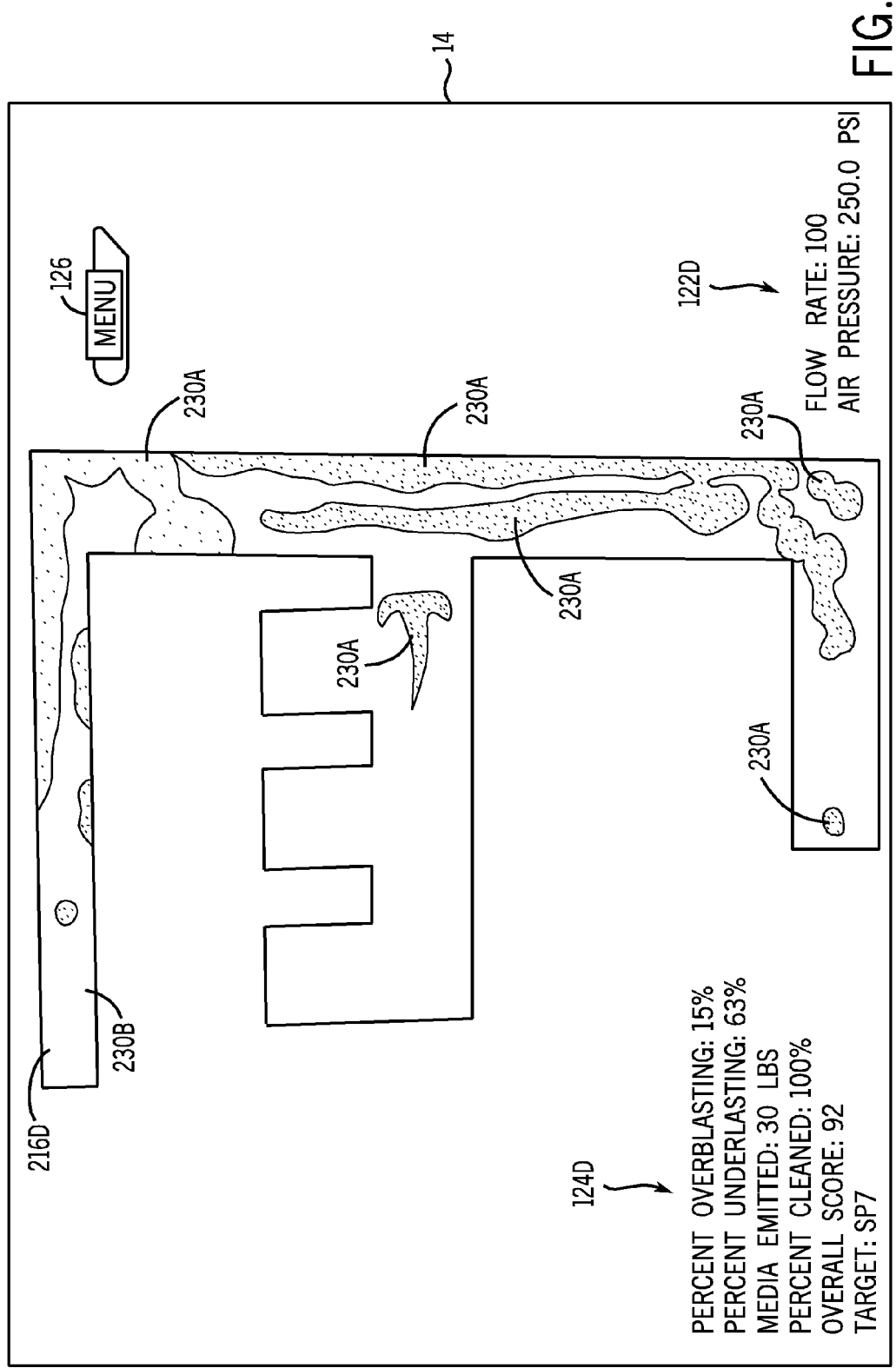
Figure 10E:
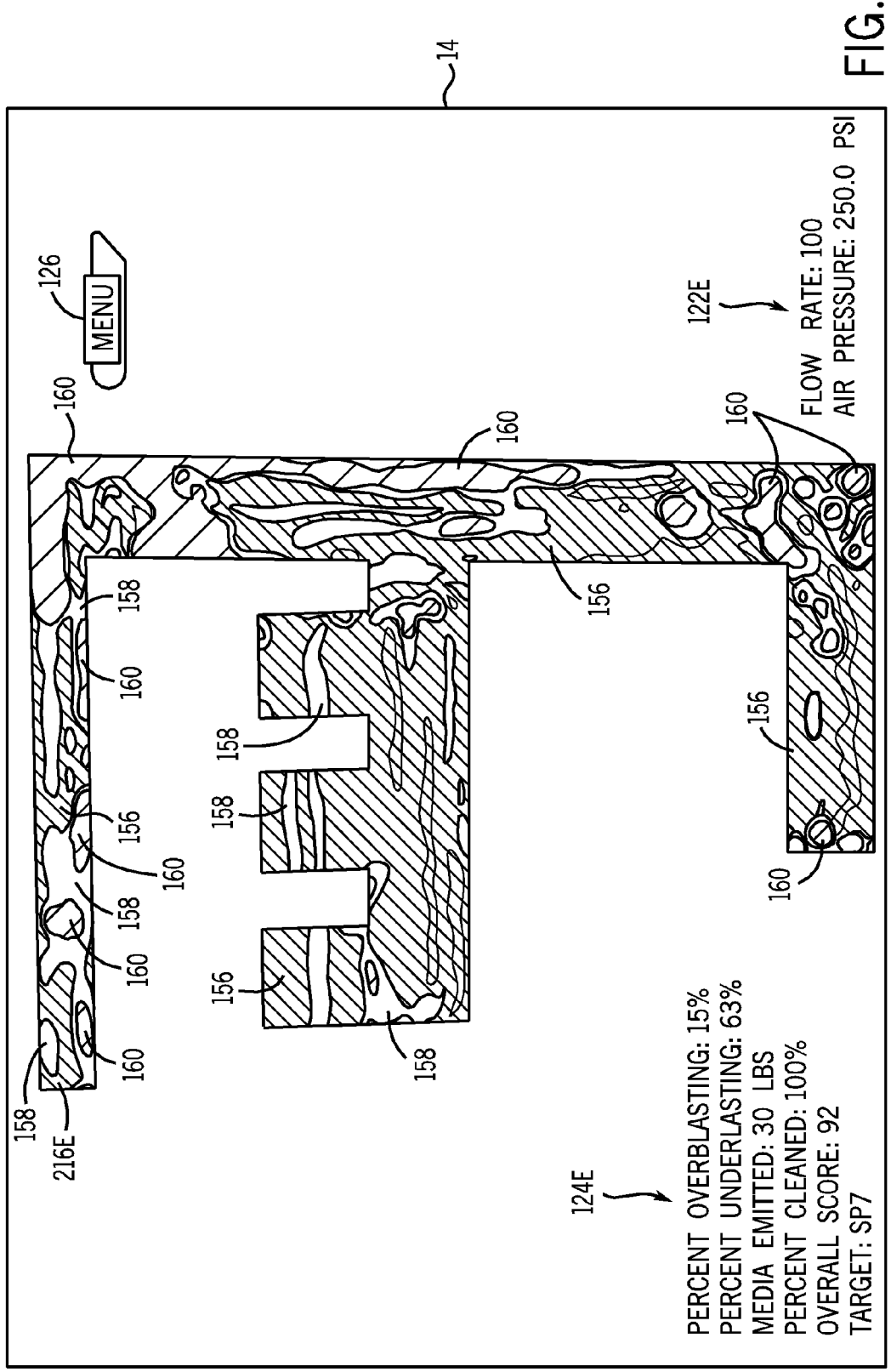

FIG. 10D shows a part 216D that has been fully blasted. Note that part 216D includes regions of lighter gray 230A and regions of medium toned gray 230B representing lighter or darker regions of the virtually blasted substrate. Also, note that the pattern on part 216D is different than that pattern which began on part 216B in FIG. 10B. Users are able to reset the lesson and begin over, and that is what has occurred before blasting for part 216D in FIG. 10D. Referring to FIG. 10E, the virtual part 216E is the same as virtual part 216D in FIG. 10D except it is shown in assessment mode. Again, areas colored in red depicted by reference numerals 160 represent regions that have been overblasted, areas that are blue depicted by reference number 156 have been underblasted, and areas colored green as depicted by reference number 158 have been blasted at or near the target surface profile. Note that in FIG. 10E, 15% of the surface has been overblasted and 63% of the surface has been underblasted, even though 100% of the surface has been cleaned properly.

It should be apparent to those skilled in the art that the preferred virtual blasting system 12 described herein includes many features designed to enhance the realism of blasting training session as well as performance monitoring of such training sessions. In part because the blasting model is based on blasting patterns collected from actual blasting experiments, the model realistically simulates actual blasting sessions. Importantly, the system 12 can be modified to include additional models for other types of blasting nozzle controllers 18 in addition to a controller simulating pressurized supplied abrasive.

Those skilled in the art should appreciate that the embodiments of the invention disclosed herein are illustrative and not limiting. Since certain change may be made without departing from the scope of the invention, it is intended that all matter contained in the above description and shown the accompanying drawings be interpreted as illustrative and not in a limiting sense.

We claim:

1. A virtual blasting system for removing coatings and/or rust from a virtual surface, the system comprising:
   a display screen on which a virtual surface is displayed, the virtual surface having an image of one or more coatings and/or rust over an underlying virtual surface which can be removed during operation of the system;
   a blasting nozzle controller outputting at least one signal indicating whether the blasting nozzle controller is in an open position or in a closed position;
   a motion tracking system that tracks the position and orientation of the blasting nozzle controller; and
   a computer programmed with software which generates virtual blast pattern data in response to at least the position and orientation data received from the tracking system and the signal indicating whether the blasting nozzle controller is in an "on" position or is in an "off" position;
   wherein an image of the one or more coatings and/or rust displayed on the virtual surface is removed from the virtual surface in real time in accordance with the effect of the virtual blast pattern with respect to each location on the virtual surface; and
   wherein the software comprises a mathematical blasting model that outputs virtual blast pattern data to characterize the resulting pattern of the virtual blast as a function of time in response to at least standoff distance and angular orientation of the blasting nozzle controller relative to the virtual surface and the blasting model distributes a blasting intensity in accordance with a combination of a radial gradient pattern and a linear gradient pattern.

2. A system as recited in claim 1 wherein the blasting model is based at least in part on actual data collected from blasting patterns generated for various blasting conditions.

3. A system as recited in claim 2 wherein the blasting intensity calculated by the blasting model is based on empirically derived values for supplied air pressure, type of blasting media, media flow rate, angle of attack, and standoff distance.

4. A system as recited in claim 1 wherein and initial image of a coating on the surface covers less than the complete virtual surface and at least a portion of the virtual surface is covered by an image of rust.

5. A system as recited in claim 1 wherein bounce back of a blasting media from the virtual surface is simulated on the display.

6. A system as recited in claim 5 wherein the bounce back of blasting media is simulated via animation that is blended with the image of the virtual surface on the display.

7. A system as recited in claim 6 wherein flakes of removed coating chips are simulated in the animation.

8. A system as recited in claim 1 wherein the radial gradient pattern distributes blasting intensity in the following manner:
   an inner circular radius defines an area of constant blasting intensity; and
   an outer circular radius defines the outer extent at which the blasting intensity becomes negligible, the blasting intensity falling off linearly between the inner and outer radius so that the blasting intensity at the outer radius is equal to zero.

9. A system as recited in claim 1 wherein the linear gradient pattern distributes blasting intensity in accordance with tilt of the blasting nozzle controller with respect to the virtual surface.

10. A system as recited in claim 1 wherein multiple colors are used to depict whether a given location on the virtual surface has been blasted an appropriate amount or under-blasted or overblasted.

11. A system as recited in claim 1 wherein pitting damage to the underlying virtual surface is depicted on the display when the virtual blast pattern has dwelled at a location on the virtual surface for too long of a time.

12. A system as recited in claim 1 wherein the software also provides part image data for an image of a part to be displayed on the screen defining the virtual surface, and wherein the image of the part is displayed on the screen defining the virtual surface as a target for the user using the blasting nozzle controller; and further wherein the color of the virtual surface represents virtual cleanliness of the surface once the one or more coatings and/or rust are removed.

13. A system as recited in claim 1 wherein the virtual surface is displayed as a two-dimensional image.

14. A system as recited in claim 1 wherein the system further comprises a head mounted display unit, and the virtual surface is displayed as a three-dimensional image in an immersive environment.

15. A system as recited in claim 1 wherein:
   the system further comprises one or more loudspeakers; and
   the software further comprises digital files of actual blasting nozzle noise, and the computer interactively generates an output sound signal when the blasting nozzle controller is in an "on" position and provides the output sound signal after a momentary delay in real time to drive the one or more loudspeakers to simulate the sound of an operating blasting nozzle.

16. A system as recited in claim 1 further comprising a graphical user interface that allows the user to select training set up parameters and settings for the blasting nozzle controller and wherein the selectable parameters on the graphical user interface consist of one or more of the following parameters: type of blasting media, supplied air pressure and media flow rate.

17. A system as recited in claim 1 further comprising a graphical user interface that includes a prompt allowing the user to select whether a multiple color assessment mode should be used to indicate whether a given location on the surface has been blasted an appropriate amount or under-blasted or overblasted.

18. A virtual blasting system for removing coatings and/or rust from a virtual surface, the system comprising:
   a display screen on which a virtual surface is displayed, the virtual surface having an image of one or more coatings and/or rust over an underlying virtual surface which can be removed during operation of the system;

a blasting nozzle controller outputting at least one signal indicating whether the blasting nozzle controller is in an open position or in a closed position;

a motion tracking system that tracks the position and orientation of the blasting nozzle controller;

a computer programmed with software which generates virtual blast pattern data in response to at least the position and orientation data received from the tracking system and the signal indicating whether the blasting nozzle controller is in an "on" position or is in an "off" position;

wherein an image of the one or more coatings and/or rust displayed on the virtual surface is removed from the virtual surface in real time in accordance with the effect of the virtual blast pattern with respect to each location on the virtual surface and further wherein the system records user performance data and has the ability to display the performance data on the graphical user interface and the user performance data includes at least one of the following calculated parameters: percent cleaned, percent overblasted, media used, elapsed time, and overall score.

19. A system as recited in claim 18 wherein the graphical user interface includes a display summarizing previous performance scores for the logged-in user.

20. A system as recited in claim 1 wherein the system further comprises a graphical user interface that prompts the user to show virtual light beams on the virtual surface to simulate the use of a light beam targeting and positioning system.

21. A system as recited in claim 1 wherein the system further comprises a graphical user interface that prompts the user whether to display performance criteria on the display screen on which the virtual surface is displayed.

22. A system as recited in claim 1 wherein the display screen includes one or more icons set apart from the virtual surface displayed on the display screen, the icons being toggled by pointing the blasting nozzle controller at the respective icon and activating the trigger on the blasting nozzle controller.

* * * * *